US010945082B2

(12) United States Patent
Solum et al.

(10) Patent No.: US 10,945,082 B2
(45) Date of Patent: Mar. 9, 2021

(54) CONFIGURABLE HEARING DEVICE FOR USE WITH AN ASSISTIVE LISTENING SYSTEM

(71) Applicant: Starkey Laboratories, Inc., Eden Prairie, MN (US)

(72) Inventors: Jeffrey Paul Solum, Greenwood, MN (US); Greg Haubrich, Champlin, MN (US); Stephen Paul Flood, Eden Prairie, MN (US); Justin R. Burwinkel, Eden Prairie, MN (US); Michael Karl Sacha, Chanhassen, MN (US); Yezihalem Mesfin, Farmington, MN (US); Fred Mustiere, Chaska, MN (US); Jumana Harianwala, Eden Prairie, MN (US); Donald James Reynolds, Fremont, CA (US); Swapan Gandhi, El Cerrito, CA (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 170 days.

(21) Appl. No.: 16/352,371

(22) Filed: Mar. 13, 2019

(65) Prior Publication Data

US 2019/0215624 A1 Jul. 11, 2019

Related U.S. Application Data

(63) Continuation of application No. 15/342,877, filed on Nov. 3, 2016, now Pat. No. 10,271,149.

(51) Int. Cl.
*H04B 7/00* (2006.01)
*H04R 25/00* (2006.01)
(Continued)

(52) U.S. Cl.
CPC ......... *H04R 25/554* (2013.01); *G06F 21/602* (2013.01); *G06F 21/72* (2013.01);
(Continued)

(58) Field of Classification Search
CPC ........... H04W 52/0241; H04W 56/001; H04W 76/19; H04R 25/55; H04R 2225/55
See application file for complete search history.

(56) References Cited

U.S. PATENT DOCUMENTS

| 5,642,426 A | 6/1997 | Neuman et al. |
| 8,849,202 B2 * | 9/2014 | Linde ................. H04W 80/02 455/41.2 |

(Continued)

FOREIGN PATENT DOCUMENTS

| EP | 2755403 | 7/2014 |
| EP | 2403273 | 8/2014 |

(Continued)

OTHER PUBLICATIONS

Kochkin et al., "Consumer Perceptions of the Impact of Inductively Looped Venues on the Utility of Their Hearing Devices", Hearing Review, Sep. 24, 2014, 12 pages.

(Continued)

*Primary Examiner* — Amir H Etesam
(74) *Attorney, Agent, or Firm* — Mueting Raasch Group

(57) ABSTRACT

A hearing device adapted for use by a wearer comprises an audio streaming circuit configured to receive electromagnetic audio streaming via a first communication link. A configuration circuit is configured to receive configuration parameters via a second communication link different from the first communication link for configuring the hearing device to receive the electromagnetic audio streaming. Control circuitry of the hearing device configures the hearing device to enable reception of the electromagnetic audio streaming in accordance with the received configuration parameters.

22 Claims, 12 Drawing Sheets

(51) Int. Cl.
   H04L 29/06     (2006.01)
   G06F 21/60     (2013.01)
   G06F 21/72     (2013.01)
   H04W 4/80          (2018.01)
   H04W 4/06          (2009.01)

(52) U.S. Cl.
   CPC ............ H04L 63/06 (2013.01); H04L 63/061 (2013.01); H04R 25/505 (2013.01); H04L 63/18 (2013.01); H04R 2225/55 (2013.01); H04W 4/06 (2013.01); H04W 4/80 (2018.02)

(56) References Cited

U.S. PATENT DOCUMENTS

| | | |
|---|---|---|
| 9,071,916 B2 | 6/2015 | Chapero-rueda et al. |
| 9,088,552 B2 | 7/2015 | Pinder |
| 9,219,966 B2 | 12/2015 | Wang et al. |
| 2009/0003637 A1 | 1/2009 | Pansell et al. |
| 2010/0054512 A1 | 3/2010 | Solum |
| 2011/0150249 A1 | 6/2011 | Klemmensen |
| 2012/0002830 A1 | 1/2012 | Solum |
| 2012/0257561 A1 | 10/2012 | Redding |
| 2013/0045684 A1 | 2/2013 | Linde et al. |
| 2014/0192988 A1 | 7/2014 | Solum |
| 2014/0193007 A1 | 7/2014 | Solum |
| 2014/0211973 A1 | 7/2014 | Wang et al. |
| 2014/0341405 A1 | 11/2014 | Pedersen et al. |
| 2015/0003653 A1 | 1/2015 | Recker et al. |
| 2015/0010179 A1 | 1/2015 | Solum |
| 2015/0312858 A1 | 10/2015 | Kerai |
| 2016/0173996 A1 | 6/2016 | Edgar et al. |
| 2016/0249356 A1* | 8/2016 | Pope ................... H04L 65/601 |

FOREIGN PATENT DOCUMENTS

| | | |
|---|---|---|
| EP | 2928212 | 10/2015 |
| WO | 2015001135 | 1/2015 |

OTHER PUBLICATIONS

EP Office Action from EP Application No. 17200031.7 dated Jun. 18, 2020, 5 pages.

CN Office Action from CN Application No. 201711070155.2 dated Jul. 25, 2019, 19 pages.

\* cited by examiner

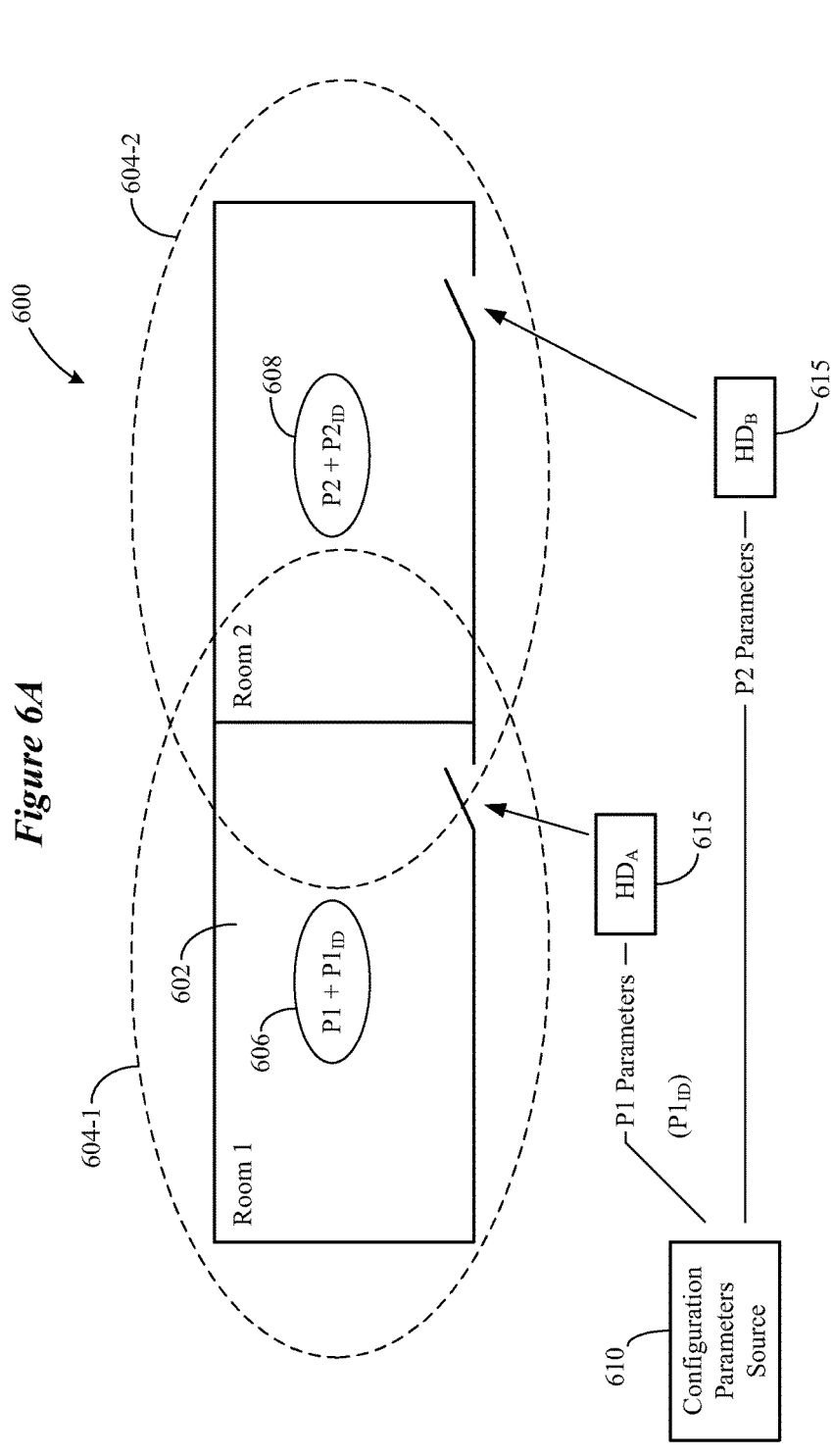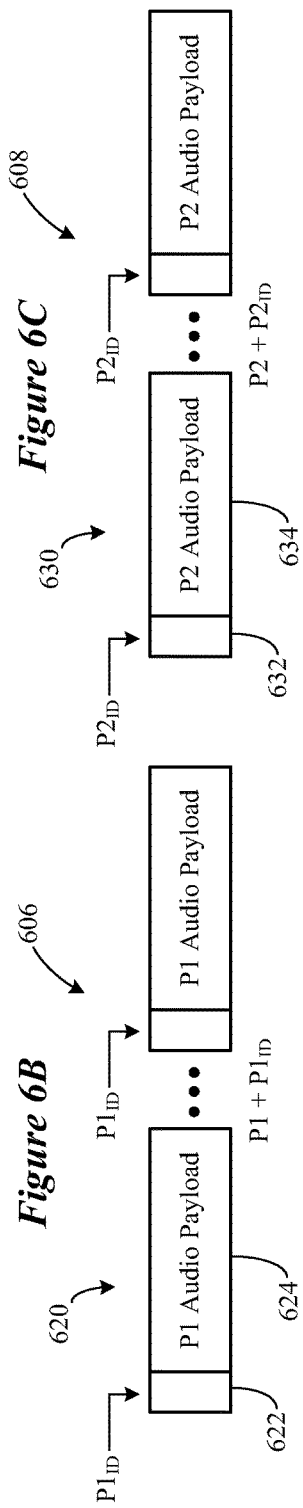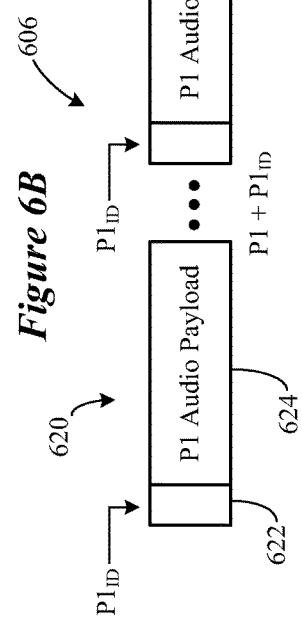

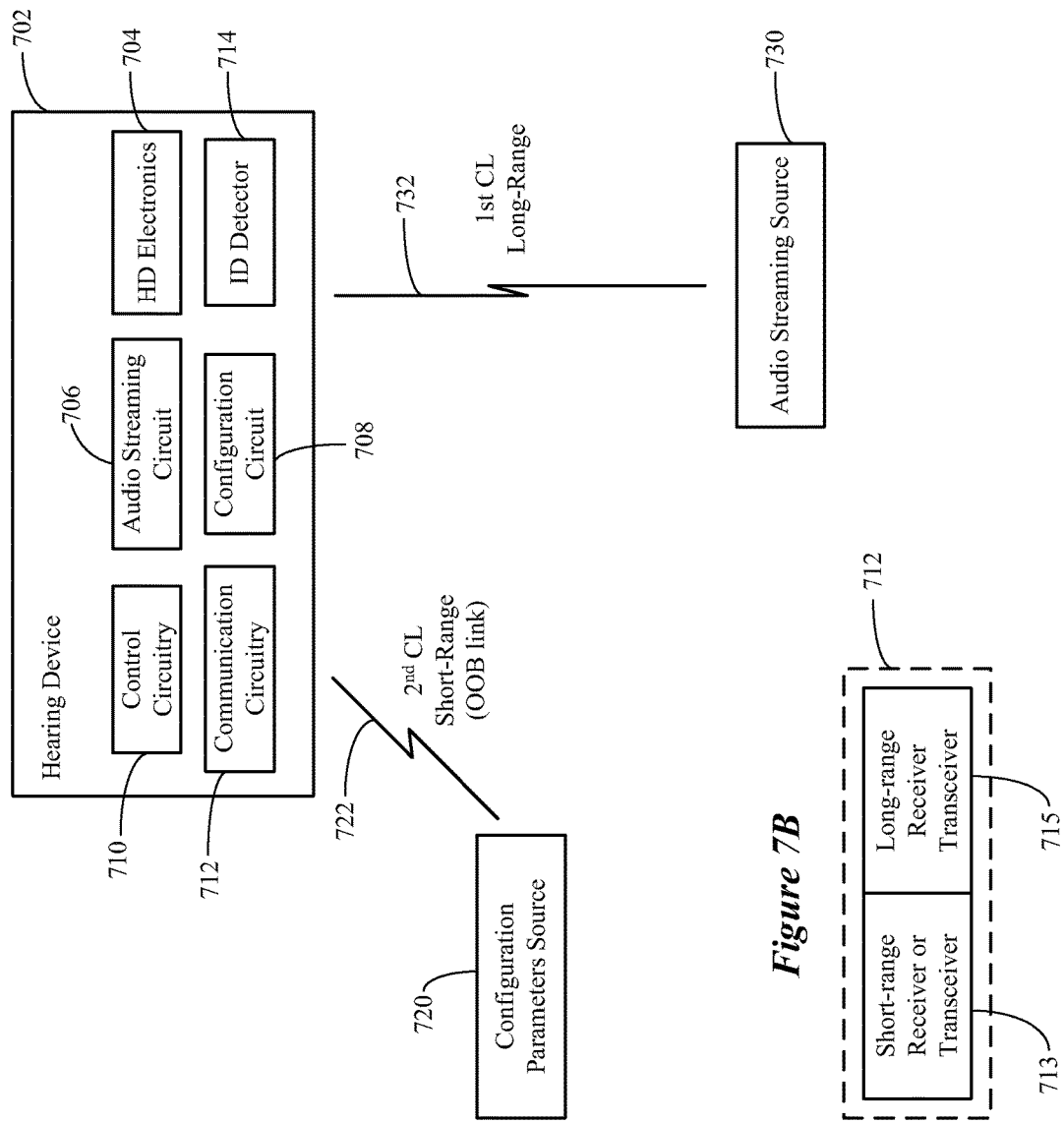

CONFIGURABLE HEARING DEVICE FOR USE WITH AN ASSISTIVE LISTENING SYSTEM

RELATED PATENT DOCUMENTS

This application is a continuation of U.S. patent application Ser. No. 15/342,877, filed Nov. 3, 2016, which is incorporated herein by reference in its entirety.

TECHNICAL FIELD

This application relates generally to hearing devices that interact with assistive listening systems.

BACKGROUND

Portable electronic devices that incorporate transceivers communicating using standardized protocols such as Bluetooth® over wireless communication links continue to gain in popularity. Hearing instruments, for example, may incorporate such wireless technology to allow the hearing instrument to communicate with other devices. For example, the hearing instrument may receive audio from a transceiver which is connected to a television or a radio. This audio may be reproduced by the speaker of the hearing instrument, hereby allowing the wearer to hear the audio source without having to disturb others by turning up the volume on the audio source.

SUMMARY

Various embodiments are directed to a hearing device adapted for use by a wearer. The hearing device comprises an audio streaming circuit configured to receive electromagnetic audio streaming via a first communication link. A configuration circuit is configured to receive configuration parameters via a second communication link different from the first communication link for configuring the hearing device to receive the electromagnetic audio streaming. Control circuitry of the hearing device configures the hearing device to enable reception of the electromagnetic audio streaming in accordance with the received configuration parameters.

Other embodiments are directed to a method of communications for a hearing device configured for use by a wearer. The method involves receiving electromagnetic audio streaming by the hearing device via a first communication link. The method also involves receiving configuration parameters by the hearing device via a second communication link different from the first communication link. The method further involves configuring the hearing device to enable reception of the electromagnetic audio streaming in accordance with the received configuration parameters.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 6A illustrates hearing devices configured to enable reception of a selected audio stream from a multiplicity of audio streams within a multicast environment in accordance with various embodiments;

FIGS. 6B and 6C illustrate audio packets that include a program identifier for transmitting modified broadcasts at a multicast venue in accordance with various embodiments;

FIG. 7A is a block diagram of a hearing device configured to receive audio streaming containing a program identifier in accordance with various embodiments;

FIG. 7B is a block diagram of the communication circuitry shown in FIG. 7A in accordance with some embodiments;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
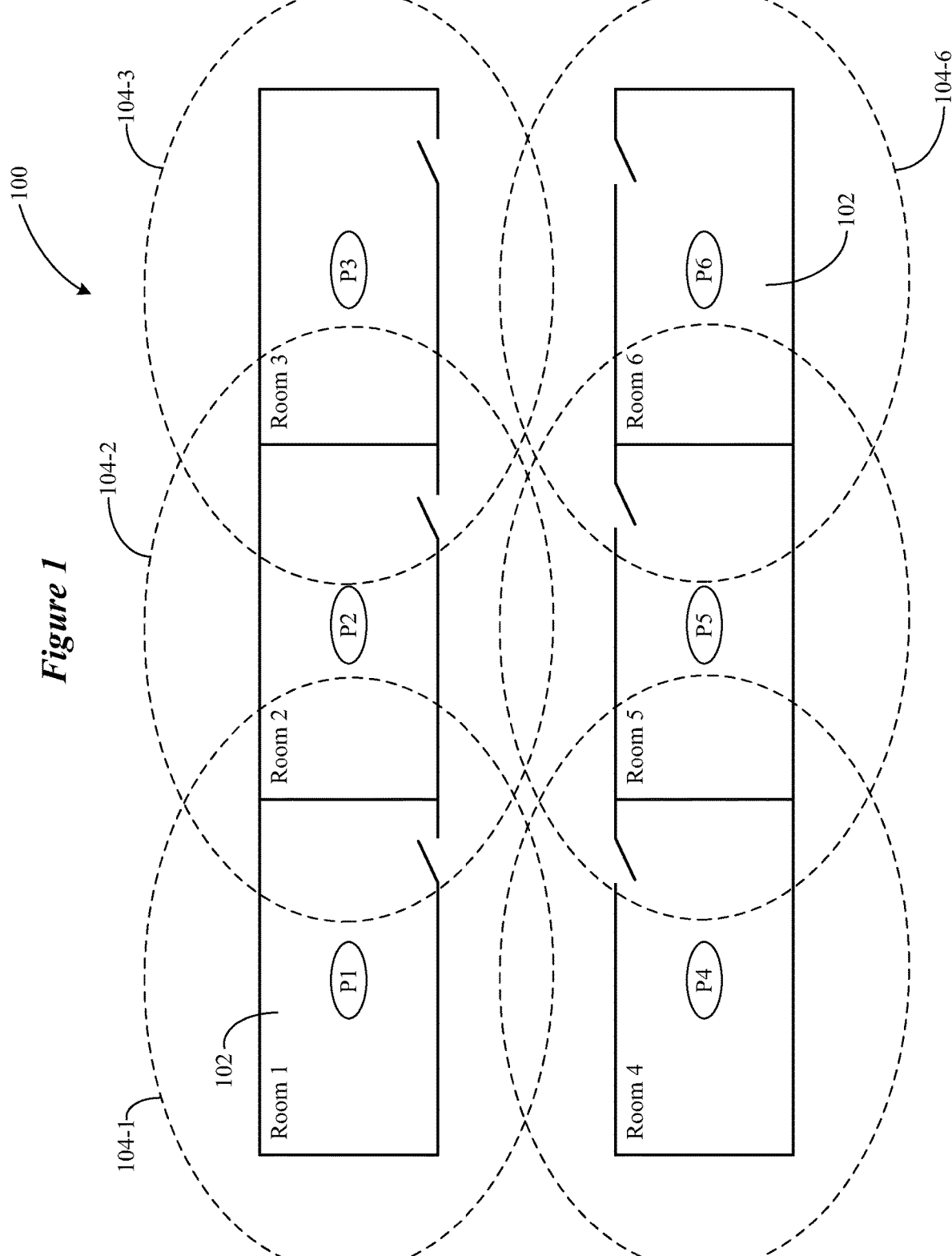
FIG. 1 illustrates a venue equipped with assistive listening systems that support concurrent transmission of audio programming for reception by a multiplicity of assistive listening devices, such as hearing devices, in accordance with various embodiments.

It is understood that the embodiments described herein may be used with any hearing device without departing from the scope of this disclosure. The devices depicted in the figures are intended to demonstrate the subject matter, but not in a limited, exhaustive, or exclusive sense. It is also understood that the present subject matter can be used with a device designed for use in or on the right ear or the left ear or both ears of the wearer.

Embodiments of the disclosure are directed to hearing devices configured to connect with and receive streaming audio from an audio source, such as an assistive listening system. Embodiments are directed to hearing devices that can be configured to receive streaming audio via a first communication link in response to receiving configuration parameters via a second communication link different from the first communication link. In some embodiments, a hearing device is configured to enable reception of a particular audio stream of a multiplicity of audio streams via a first communication link using configuration parameters comprising an audio stream identifier received via a second communication link. In other embodiments, a hearing device is configured to enable reception of audio streaming via a secured first communication link in response to receiving a cryptographic key via a second communication link. According to embodiments of the disclosure, the first communication link is a long-range link and the second communication link is a short-range link.

The term hearing devices refers to a wide variety of devices that can aid a person with impaired hearing. Hearing devices of the present disclosure include hearables (e.g., wearable earphones, headphones, virtual reality headsets), hearing aids (e.g., hearing instruments), cochlear implants, and bone-conduction devices, for example. Hearing devices include, but are not limited to, behind-the-ear (BTE), in-the-ear (ITE), in-the-canal (ITC), receiver-in-canal (RIC), receiver-in-the-ear (RITE) or completely-in-the-canal (CIC) type hearing devices. Hearing devices can also be referred to as assistive listening devices in the context of assistive listening systems. Throughout this disclosure, reference is made to a "hearing device," which is understood to refer to a single hearing device or a pair of hearing devices.

Hearing devices can include a housing or shell within which various internal components are disposed. Typical internal components of a hearing device can include a signal processor, memory, power management circuitry, one or more communication devices, one or more antennas, one or more microphones, and a receiver/speaker, for example. Hearing devices can incorporate a communication device, such as a Bluetooth® transceiver, which can provide for enhanced connectivity with assistive listening systems. Embodiments of the disclosure are directed to hearing devices configured to interact with external audio systems, such as assistive listening systems.

Wireless assistive listening systems are useful in a variety of situations and venues where listening by persons with impaired hearing have difficulty discerning sound (e.g., a person speaking or an audio broadcast or presentation). Wireless assistive listening systems can be useful at venues such as theaters, museums, convention centers, music halls, classrooms, restaurants, conference rooms, bank teller stations or drive-up windows, point-of-purchase locations, and other private and public meeting places. Conventional assistive listening systems can employ a variety of technologies to communicate audio signals from a source to an assistive listening device (e.g., a hearable or hearing aid) including frequency modulation (FM) transmission, infrared (IR) transmission, and induction loop (IL) transmission, for example. The cost of conventional assistive listening systems can be appreciable. Hearing devices of the present disclosure can be used with assistive listening systems of reduced complexity and cost.

FIG. 1 illustrates a venue 100 equipped with assistive listening systems that support concurrent transmission of audio programming for reception by a multiplicity of assistive listening devices, such as hearing devices. The venue 100 shown in FIG. 1 is generally representative of a multicast environment in which a multiplicity of audio programs are transmitted within specified rooms or regions for reception by assistive listening devices positioned within such specified rooms or regions. The venue 100, which can represent a theater for example, includes a number of rooms 102 within which an audio program (e.g., a movie soundtrack) is being transmitted. In each room 102 (Rooms 1-6), a particular audio program (P1-P6) is transmitted, which produces an audio field 104 that encompasses each room 102. It is noted that the term multicast is intended to refer to either secured or unsecured multicasting. Some embodiments of the disclosure are directed to unsecured multicasting or broadcasting while others are directed to secured multicasting or broadcasting.

As is shown in FIG. 1, the audio field 104 associated with each of the audio programs can extend beyond the confines of the room 102 within which the audio program is transmitted. For example, transmission of audio program P1 within Room 1 results in an audio field 104-1 that encompasses Room 1 but also extends into neighboring Room 2. Transmission of audio program P2 within Room 2, for example, results in an audio field 104-2 that encompasses Room 2 but also extends into neighboring Rooms 1 and 3. In a multicast venue 100 such as that shown in FIG. 1, an assistive listening device, such as a hearing device, can be exposed to a multiplicity of extraneous audio fields in addition to a selected audio field. Without the ability to appropriately discern between competing audio fields (e.g., fields 104-1, 104-2, 104-3), a hearing device or other assistive listening device may be unable to reliably select a desired audio program between competing audio programs for playback to the user of the hearing device or other assistive listening device.

Moreover, a multicast environment of the type depicted in FIG. 1 complicates the ability to limit reception of an audio program broadcast to only authorized assistive listening devices (e.g., hearing devices). For example, and with reference to FIG. 1, reception of audio program P6 should be limited to reception by hearing devices of wearers who have paid for the presentation of audio program P6. The wearer of a hearing device who has paid for presentation of audio program P3 should be permitted to listen to audio program P3, but prevented from receiving audio program P6 and other audio programs broadcast at the venue 100. Embodiments of the disclosure are directed to hearing devices that provide for reception of specified streaming audio to the exclusion of other streaming audio transmitted within a multicast environment.

Figure 2:
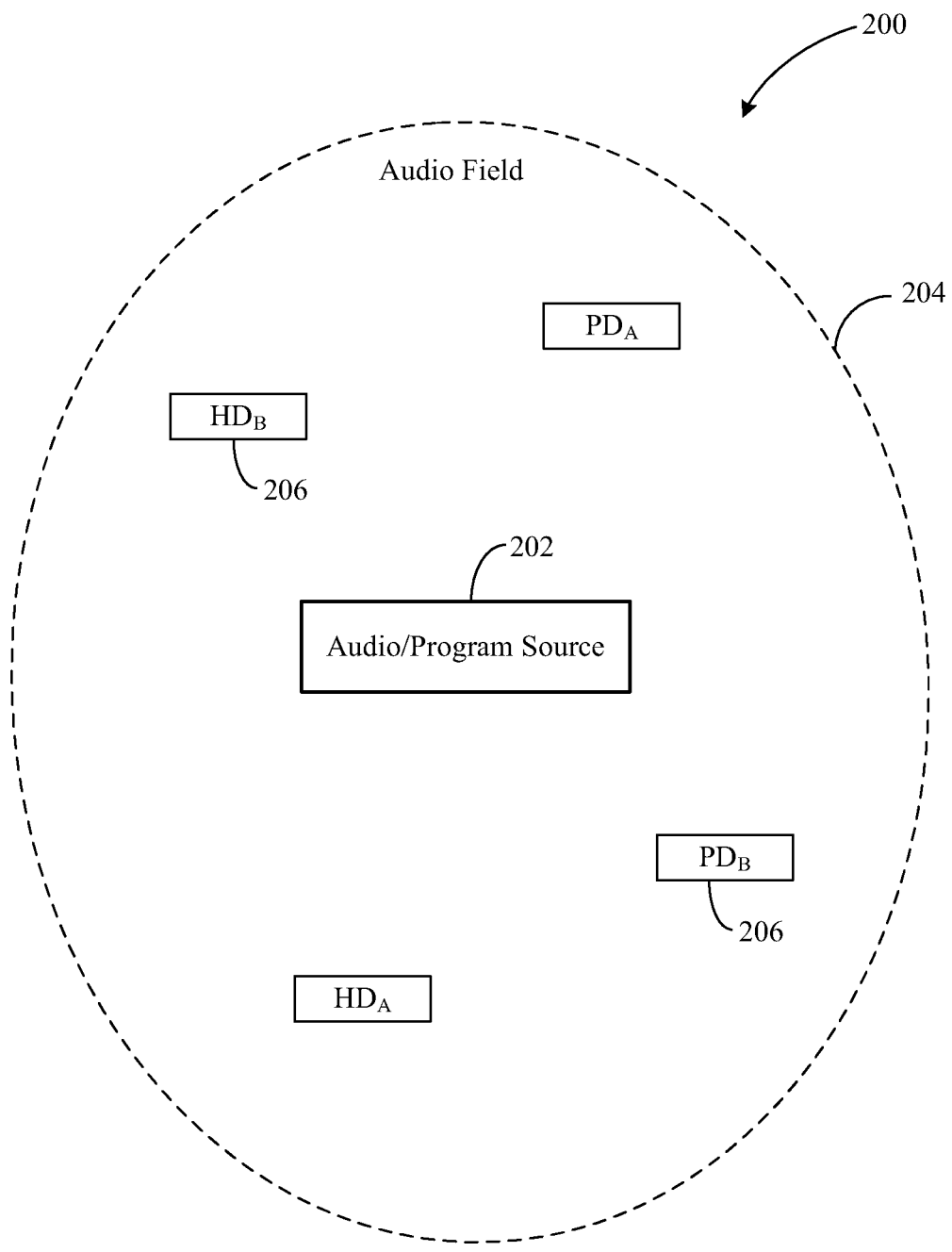
FIG. 2 illustrates a venue equipped with an assistive listening system that supports transmission of audio programming or communication for reception by an assistive listening device, such as hearing device, in accordance with various embodiments.

FIG. 2 illustrates a venue 200 within which a number of different portable communication devices 206 are carried or worn by a multiplicity of persons. The portable communication devices 206 can include hearing devices (e.g., $HD_A$, $HD_B$) as well as other types of portable communication devices (e.g., $PD_A$, $PD_B$), such as smartphones and tablets. In the representative venue 200 shown in FIG. 2, each of the portable communication devices 206 is positioned within an audio field 204 produced by an audio or program source 202. In some scenarios, the audio/program source 202 can transmit an audio program or an audio/video program, for example. In other scenarios, the audio/program source 202 transmits an audio stream in the form of human voice sounds, such as voice sounds produced by a teller at a bank or a vendor at a kiosk, for example.

In the environment illustrated in FIG. 2, it may be desirable to establish a secured communication link between the audio/program source 202 and one or more of the portable communication devices 206. For example, the wearer of a hearing device, $HD_A$, may wish to communicate confidential information to a bank teller via the audio/program source 202 located at the bank. Because other portable communication devices 206 can be exposed to the same audio field 204 as the wearer of the hearing device, $HD_A$, it would be desirable that the wearer's hearing device, $HD_A$, but not other portable communication devices 206 within the audio field 204, be enabled to receive and reproduce the audio stream transmitted by the audio/program source 202. Moreover, it would be desirable that the mechanism to establish a secured communication link between the wearer's hearing device, $HD_A$, and the audio/program source 202 involve a communication link (e.g., a short-range link) different from that used to produce the audio field 204.

Figure 3:
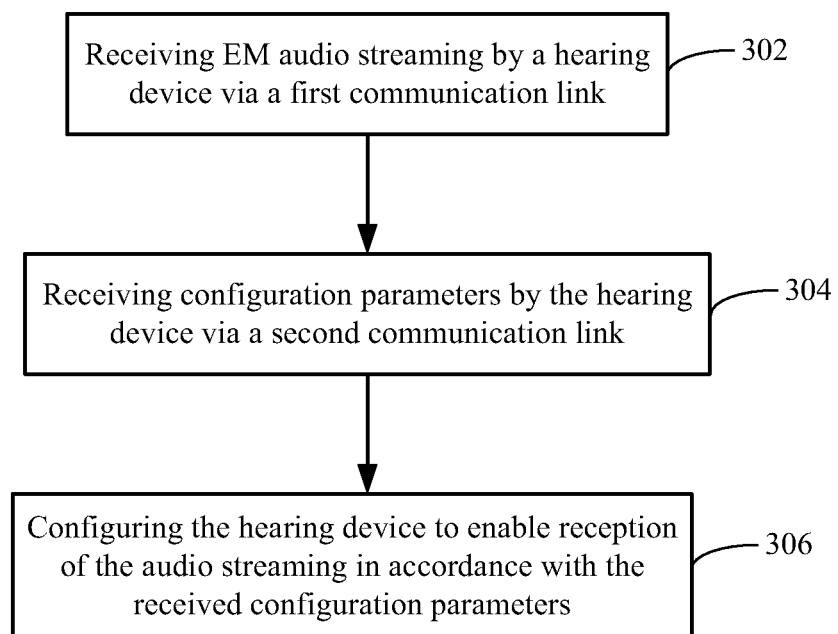
FIG. 3 is a flow diagram of a method for communicating with a hearing device in accordance with various embodiments.

FIG. 3 is a flow diagram of a method for communicating with a hearing device in accordance with various embodiments. The method shown in FIG. 3 is particularly well-suited for providing selective and/or secured communication between an audio/program source and a hearing device in accordance with the representative scenarios shown in FIGS. 1 and 2 (and other scenarios). The method illustrated in FIG. 3 involves receiving 302 electromagnetic (EM) audio streaming by a hearing device via a first communication link. The method also involves receiving 304 configuration parameters by the hearing device via a second communication link which is different from the first communication link. The method further involves configuring 306 the hearing device to enable reception of the audio streaming in accordance with the received configuration parameters.

Figure 4:
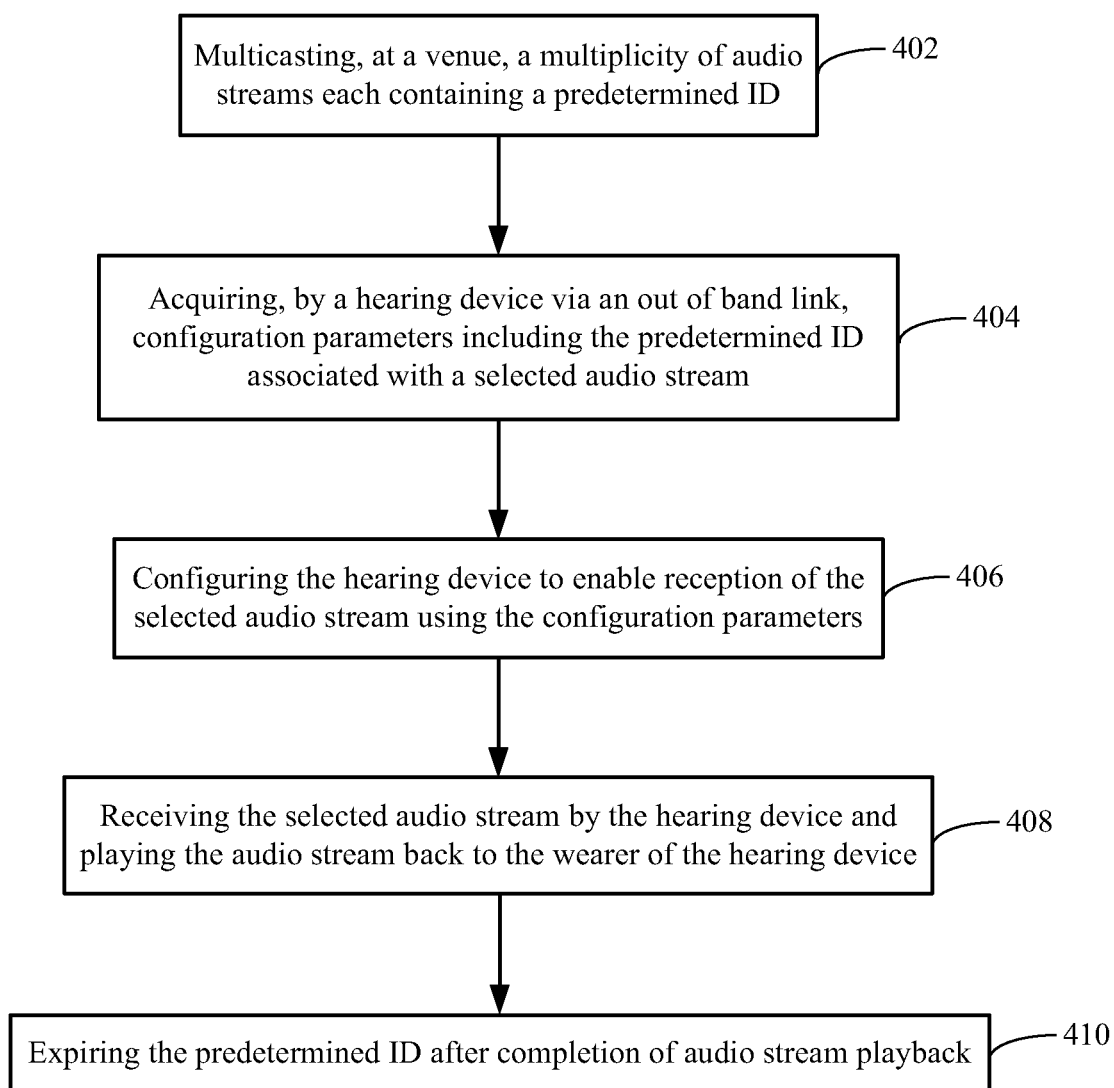
FIG. 4 is a flow diagram of a method for communicating with a hearing device in accordance with some embodiments.

FIG. 4 is a flow diagram of a method of communicating with a hearing device in accordance with other embodiments. The method shown in FIG. 4 is well-suited for providing communication between a hearing device and a selected one of a multiplicity of audio streams available at a multicast venue (e.g., see FIG. 1). The method illustrated in FIG. 4 involves multicasting 402, at a venue, a multiplicity of audio streams each containing a predetermined program identifier (ID). The method involves acquiring 404, by a hearing device via an out of band link, configuration parameters including the predetermined ID associated with the selected audio stream. The method also involves configuring 406 the hearing device to enable reception of the selected audio stream using the configuration parameters. The method further involves receiving 408 the selected audio stream by the hearing device and playing back the audio stream to the wearer of the hearing device. According to some embodiments, the method also involves expiring 410 the predetermined ID after completion of the audio stream playback or in response to an expiration event.

Figure 5:
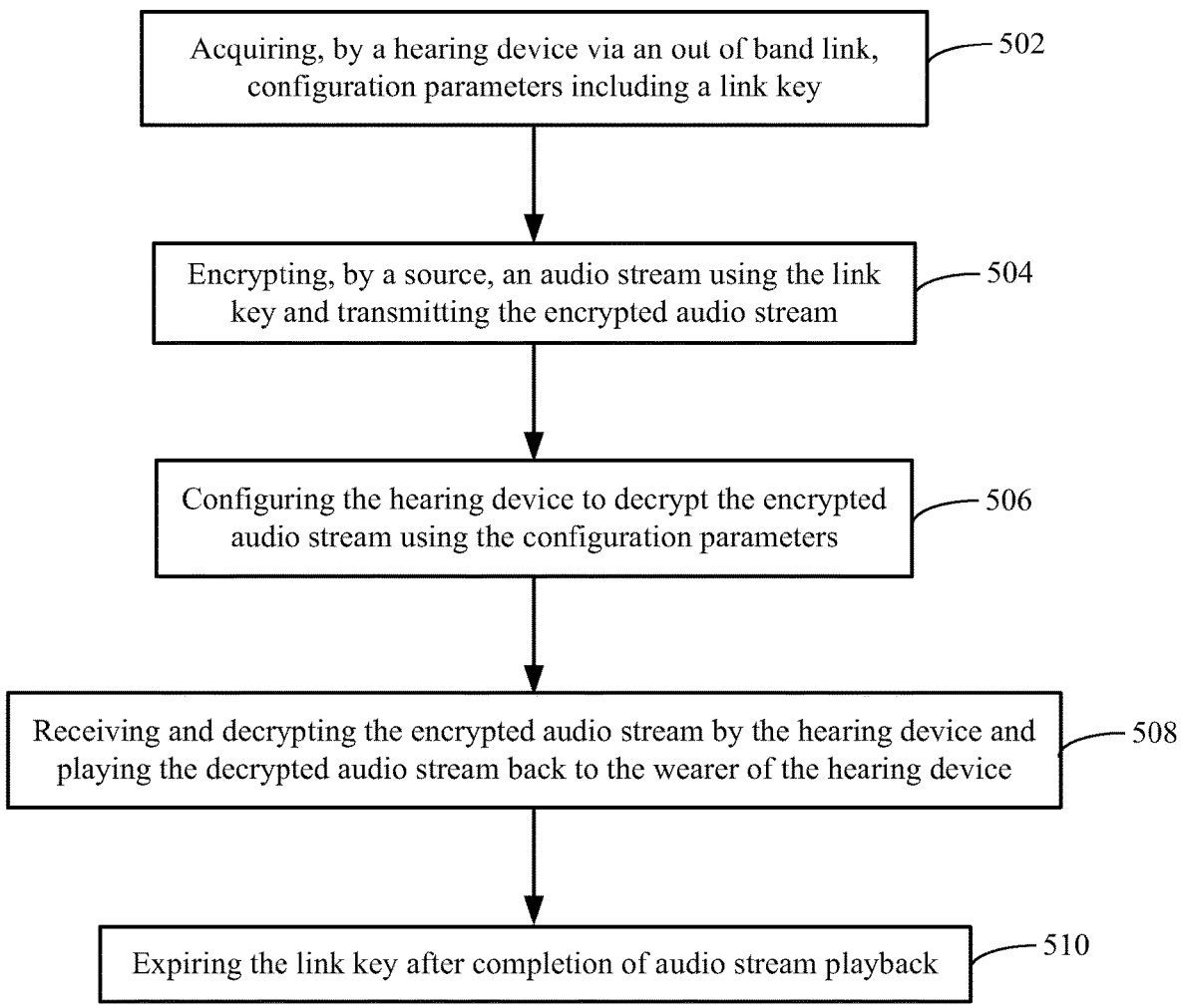
FIG. 5 is a flow diagram of a method for communicating with a hearing device in accordance with other embodiments.

FIG. 5 is a flow diagram of a method of communicating with a hearing device in accordance with further embodiments. The method shown in FIG. 5 is well-suited for providing secure communication between a hearing device and an audio/program source (e.g., see FIG. 2). The method illustrated in FIG. 5 involves acquiring 502, by a hearing device via an out of band link, configuration parameters including a link key. The method involves encrypting 504, by a source, an audio stream using the link key and transmitting the encrypted audio stream. The method also involves configuring 506 the hearing device to decrypt the encrypted audio stream using the configuration parameters. The method further involves receiving and decrypting 508 the encrypted audio stream by the hearing device, and playing back the decrypted audio stream to the wearer of the hearing device. According to some embodiments, the method also involves expiring 510 the link key after completion of audio stream playback or in response to an expiration event.

FIGS. 6A-10 illustrate hearing devices configured to enable reception of a selected audio stream from a multiplicity of audio streams within a multicast environment in accordance with various embodiments. FIG. 6A shows a representative multicast venue 600 which, for purposes of simplicity, includes two rooms 602 within which separate audio programs 606 and 608 are concurrently presented. It is understood that, in some scenarios, the rooms 602 can be separated by walls or other vertical/blocking structures. In other scenarios, the rooms 602 can define spatially separated regions with no walls or partial walls separating adjacent regions, such as booths within a convention center. The venue 600 can be a theater, a convention center, or other public venue which includes a number of spatially separated rooms or regions 602.

A specified audio or audio/video presentation is broadcast in each room 602 for reception by hearing devices 615 worn by persons standing or sitting within the respective rooms 602. For example, a first audio program 606 is broadcast in Room 1, which generates an audio field 604-1 that encompasses Room 1 and at least a portion of neighboring Room 2. A second audio program 608 is broadcast in Room 2, which generates an audio field 604-2 that encompasses Room 2 and at least a portion of Room 1. It is understood that the multicast environment 600 shown in FIG. 6A can include any number of rooms or regions 602 and any number of competing and/or overlapping audio fields 604.

In the illustrative scenario shown in FIG. 6A, a wearer of a first hearing device, $HD_A$, wishes to listen to the first audio program 606 in Room 1, while a wearer of a second hearing device, $HD_B$, wishes to listen to the second audio program 608 in Room 2. For example, each hearing device wearer may have purchased a movie ticket with the expectation of listing only to a movie soundtrack specific to Room 1 or Room 2. Because the audio fields 604-1 and 604-2 extend beyond the confines of Rooms 1 and 2, is possible for the hearing devices $HD_A$ and $HD_B$ to receive and playback the movie soundtrack from a neighboring room, which would clearly be undesirable. As another example, a theater owner has the expectation that moviegoers will purchase a movie ticket to enjoy a particular movie in a particular theater specified by the movie ticket, and not a different movie presented in a different theater either concurrently or at a different time.

Embodiments of the hearing devices 615 shown in FIGS. 6A-10 can be configured to enable reception of a specified audio stream to the exclusion of other audio streams being broadcasted at a multicast venue concurrently or at different times. Embodiments of the hearing devices 615 shown in FIGS. 6A-10 can be configured to receive a specified audio stream from an audio streaming source without having to pair with the audio streaming source. For example, communication links established between hearing devices 615 and audio streaming sources at a multicast venue need not be secured links. Embodiments of the hearing devices 615 shown in FIGS. 6A-10 can obviate the need for a complex pairing procedure while providing the capability to receive a specified audio stream from a multiplicity of competing audio streams at a multicast venue. It is understood that pairing and secured links can be utilized in some embodiments.

As is shown in FIG. 6A, the first audio program 606 (P1) is broadcasted in Room 1 at the multicast venue 600, and the second audio program 608 (P2) is broadcasted in neighboring Room 2. In accordance with various embodiments, the first audio program 606 is considered a modified audio program or broadcast, in that a program ID (P1$_{ID}$) has been incorporated in the first audio program P1. The second audio program 608 is considered a modified audio program or broadcast, in that a program ID (P2$_{ID}$) has been incorporated in the second audio program P2. FIG. 6B is a representative example of the modified program 606 (P1+P1$_{ID}$) in accordance with various embodiments. In this illustrative embodiment, the program P1 represents a packetized audio stream comprising audio packets 620. The program P1 is modified by the audio streaming source to include a program ID, P1$_{ID}$, which can be inserted in the header of each of the packets 620, for example. The program P2 represents a packetized audio stream comprising audio packets 630. The program P2 is modified by the audio streaming source to include a program ID, P2$_{ID}$, which can be inserted in the header of each of the packets 630. It is noted that a program ID can uniquely identify a specific audio program, a specific transmitter (audio streaming source), or a specific audio program and a specific transmitter.

A configuration parameters source 610 is preferably situated at the multicast venue 600. For example, the configuration parameters source 610 can be an electronic device situated in the lobby of the venue 600, at the entrance or door of a specific room 602, within a specific room 602 or other location at the venue 600. The configuration parameters source 610, embodiments of which are described herein below, is configured to interact with hearing devices 615 at the venue 600 directly or indirectly (e.g., via a smartphone or a neck-worn communicator). According to various embodiments, each of the hearing devices 615 communicates directly or indirectly with the configuration parameters source 610 via a second communication link (e.g., an out of band link) distinct from a first communication link used by the hearing devices 615 for receiving audio streaming from an audio streaming source. For example, a hearing device 615 can communicate directly or indirectly with the configuration parameters source 610 via a short-range link, which may be an unsecured (but range-limited) or secured link. Configuration parameters received from the configuration parameters source 610 can enable the hearing device 615 to receive audio streaming from an audio streaming source via a long-range link. In some implementations, the close proximity between the hearing devices and the configuration parameters source 610 provides sufficient security against eavesdropping that obviates the need for a secured link there between. In other implementations, a secured link can be established between the hearing devices and the configuration parameters source 610 to prevent eavesdropping.

As is shown in FIG. 6A, a hearing device HD$_A$ interacts directly or indirectly with the configuration parameters source 610 to obtain configuration parameters including the program ID (P1$_{ID}$) associated with the first audio program 606 (P1) scheduled for broadcasting in Room 1. In addition to the program ID, the configuration parameters can include one or more of a transmitter address or frequency, channel hopping sequence, and connection interval, etc. In response to receiving the configuration parameters, the hearing device HD$_A$ is configured to establish a communication link with the audio streaming source for Room 1, preferably without having to pair with the audio streaming source. The hearing device HD$_A$ is also configured to detect the program ID P1$_{ID}$ in the audio stream packets that are received by the hearing device HD$_A$. As such, the hearing device HD$_A$ is enabled to detect and receive the modified broadcast P1+P1$_{ID}$, while ignoring other modified broadcasts (e.g., P2+P2$_{ID}$) at the multicast venue 600. In a similar manner, the hearing device HD$_B$ is configured to detect the program ID P2$_{ID}$ in the audio stream packets that are received by the hearing device HD$_B$. Accordingly, the hearing device HD$_B$ is enabled to detect and receive the modified broadcast P2+P2$_{ID}$, while ignoring other modified broadcasts (e.g., P1+P1$_{ID}$) at the multicast venue 600.

FIG. 7A is a block diagram of a hearing device configured to receive audio streaming containing a program ID in accordance with various embodiments. The hearing device 702 shown in FIG. 7A is configured to communicate with an audio streaming source 730 via a first communication link 732. The first communication link 732 is considered a long-range link capable of wirelessly coupling the hearing device 702 with an audio streaming source at a public or private venue. Depending on the venue, the first communication link 732 can have a range of tens, hundreds, or thousands of feet, for example. The first communication link 732 can be a link in compliance with various standards, including IEEE 802.11 (e.g., WiFi®) and Bluetooth®. Bluetooth® 5.0, for example, specifies a four-fold increase in range, a two-fold increase in speed, and an eight-fold increase in data broadcasting capacity over a Bluetooth® 4.2 standard. The first communication link 732 can be a high frequency link capable of off body communications such as a 900 MHz or 2.4 GHz link.

In some embodiments, the first communication link 732 is a Bluetooth® Low Energy (BLE) link configured or adapted to support audio streaming. Various known techniques can be used to enable audio streaming via a BLE link that complies with Bluetooth® 4.2 core specifications. It is anticipated that future BLE specifications will directly support audio streaming without the need for special or proprietary protocols. It is also anticipated that future BLE specifications will support a large number of data channels, such as in excess of 20 or 30 (e.g., 37) data channels, thereby providing for an enhanced multicasting capability.

The hearing device 702 shown in FIG. 7A is also configured to communicate with a configuration parameters source 720 via a second communication link 722. The second communication link 722 is considered a short-range link capable of wirelessly coupling the hearing device 702 and a communication device of the configuration parameters source 720. In some embodiments, the second communication link 722 is an out of band link relative to the first communication link 732. As will be discussed herein below, a variety of technologies can be employed to establish an out of band link 722 between the hearing device 702 and the configuration parameters source 720. In some embodiments, the second communication link 722 is an unsecured link, which relies on close proximity between the hearing device 702 and the configuration parameters source 722 to preclude eavesdropping. In other embodiments, the second communication link 722 is a secured link.

The hearing device 702 includes electronics 704 which are commonly included in a hearing aid or other hearable. For example, the hearing device electronics 704 can include a signal processor, memory, power management circuitry, one or more microphones, and a receiver/speaker, for example. The hearing device 702 also includes communication circuitry 712 configured to establish a short-range link 722 with the configuration parameters source 720 and a long-range link 732 with the audio streaming source 730. According to some embodiments, and with reference to FIG. 7B, the communication circuitry 712 can include a short-range receiver or transceiver 713 and a separate long-range receiver or transceiver 715. The hearing device 702 also includes an audio streaming circuit 706 configured to process an electromagnetic audio stream received from the audio streaming source 730 via the first communication link 732.

Control circuitry 710 cooperates with a configuration circuit 708 to configure the hearing device 702 to enable reception of an audio stream transmitted by the audio streaming source 730. The configuration circuit 708 can receive configuration parameters transmitted by the configuration parameters source 720 via the second communication link 722. Using the received configuration parameters, the control circuitry 710 configures the hearing device 702 to enable reception of the audio stream in accordance with the received configuration parameters.

For example, the configuration circuit 708 can configure the communication circuitry 712 to establish wireless connectivity with the audio streaming source 730 using appropriate configuration parameters such as transmitter address or frequency, channel hopping sequence, connection interval, program ID, etc. In some implementations, the audio streaming source 730 can be set to a transmit-only mode, and the hearing device 702 can be set to a receiver-only mode. In other implementations, the audio streaming circuit 706 comprises a BLE transceiver and the hearing device 702 can be set to a mode of operation to receive streaming from a BLE modified-broadcast source. When this mode is initiated, the hearing device 702 can be programmed with the BLE transmitter address of a specific audio streaming source 730 from which audio streaming will be received. It is noted that the audio streaming source(s) 730 associated with each room or region of a multicast venue typically has a unique transmitter address, such as a unique Bluetooth® device address (BD_ADDR). An ID detector 714 of the hearing device 702 is configured to detect the program ID incorporated in the audio stream of interest. The audio streaming circuit 706 is configured to process audio packets received by the communication circuitry 712 having a program identifier corresponding to the program ID detected by the ID detector 714.

As was discussed previously, the configuration parameters needed for a hearing device to receive a specified audio stream to the exclusion of other audio streams at a multicast venue can be acquired by the hearing device in a number of different ways. In some embodiments, configuration parameters can be transmitted directly from a configuration parameters source to the hearing device, which then configures itself to receive a specified audio stream. In other embodiments, configuration parameters can be transmitted indirectly from the configuration parameters source to a hearing device, such as by use of an intermediary device. For example, configuration parameters can be transmitted from a configuration parameters source to a portable communication device (e.g., a smartphone), and then from the portable communication device to the hearing device. In some embodiments, the portable communication device can configure the hearing device to receive a specified audio program without having to transfer configuration parameters to the hearing device.

Figure 8:
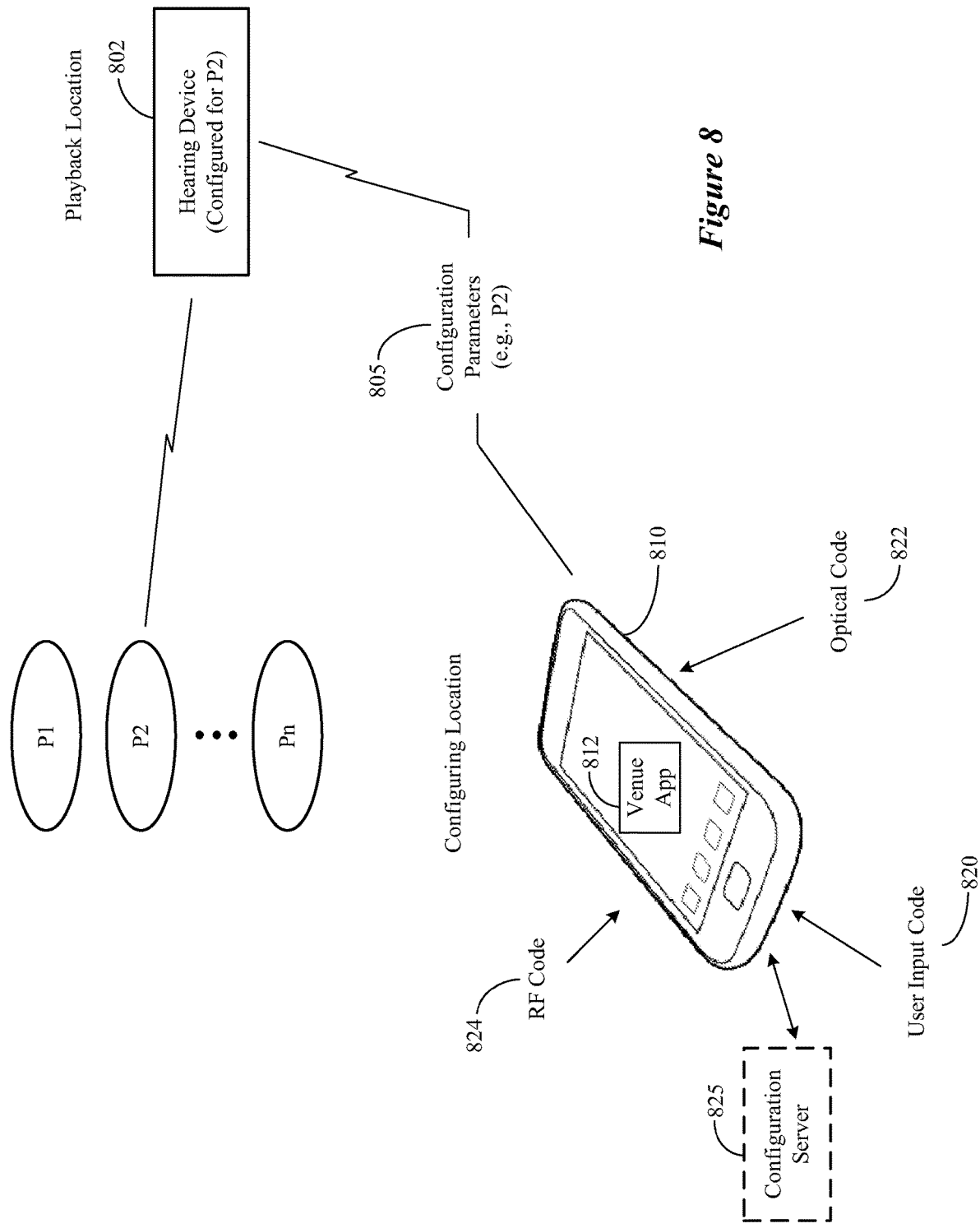
FIG. 8 shows a portable communication device configured to cooperate with a hearing device to enable reception of a specified audio stream by the hearing device in accordance with various embodiments.

FIG. 8 shows a portable communication device configured to cooperate with a hearing device to enable reception of a specified audio stream by the hearing device in accordance with various embodiments. In the illustrative example shown in FIG. 8, the portable communication device is represented as a smartphone 810. The smartphone 810 is configured to execute a venue app 812, which can be downloaded either temporarily or permanently from an app store, a website, or other app source. The smartphone 810 can be used to transfer configuration parameters 805 associated with a particular audio program to the hearing device 802 via an RF link (e.g., a BLE link). The hearing device 802 can configure itself to receive the particular audio program via an RF link (e.g., a BLE link) using the configuration parameters 805 received from the smartphone 810. It is noted that the smartphone 810 and the hearing device 802 are typically paired devices. As was discussed previously, the hearing device 802 need not be paired with the audio streaming source that transmits the particular audio program at the venue for reception by the hearing device 802.

For example, the wearer of the hearing device 802 may be interested in listening to an audio program P2 that will be streamed at a particular venue. The venue app 812 can be used by the wearer prior to arriving at the venue to select audio program P2, which may involve payment of a fee at some point. In response to selecting audio program P2, the venue app 812 can receive configuration parameters from a server 825 that will allow the hearing device 802 to receive the audio program P2 at the venue. The configuration parameters can be specific to the audio program P2 (e.g., program code P2$_{ID}$) and the day and time of the broadcast. In a scenario in which a BLE modified-program is broadcasted at the venue, the configuration parameters transferred from the server 825 to the smartphone 810 can include a program code (e.g., P2$_{ID}$), transmitter address or frequency, channel hopping sequence, connection interval, etc.

Preselection of the audio program P2 using the smartphone 810 allows the smartphone's BLE link (e.g., short range, and optionally encrypted, link) to transmit the configuration parameters 805 to the hearing device 802 when arriving at the venue. For example, and assuming the wearer of the hearing device 802 has arrived at the venue, the venue app 812 can be used by the wearer to transfer the configuration parameters to the hearing device 802 at the appropriate time, which in turn configures the hearing device 802 to receive the selected audio program P2 from an audio streaming source at the venue. When leaving the venue at the conclusion of the audio program P2, the venue app 812 can be used to terminate the BLE link to the audio streaming source, allowing normal hearing device function to resume.

The venue app 812 operating on the smartphone 810 can acquire hearing device configuration information in a number of different ways. According to one approach, the wearer of the hearing device 802 can receive a code at the venue, such as at a ticket counter or an electronic kiosk. The code can be a numerical code or an alphanumeric code. For example, the code can be the room ID at the venue where the desired audio program will be broadcasted. The user can input the code 820 into the venue app 812 using the keys or voice interface of the smartphone 810. In response to the user input code 820, the venue app 812 can obtain the appropriate configuration parameters 805 for the selected audio program (e.g., P2) from the server 825. At the appropriate time, such as immediately before the audio program begins, the venue app 812 can be used to enable the smartphone's BLE link to transmit the configuration parameters 805 to the hearing device 802. The hearing device 802 configures itself or is configured by the smartphone 810 to enable reception of the selected audio program in the form of a modified broadcast (e.g., P2+P2$_{ID}$). At the conclusion of the audio program, the venue app 812 can be used to terminate the BLE link to the audio streaming source, allowing resumption of normal hearing device function.

The venue app 812 can acquire hearing device configuration information using the camera of the smartphone 810 in accordance with various embodiments. The smartphone's camera can be used to read (e.g., scan or photograph) a configuration barcode 822 (e.g., a QR code) at a ticket counter or an electronic kiosk in the venue lobby, for example. The venue app 812 can obtain the appropriate configuration parameters 805 for the selected audio program (e.g., P2) from the server 825 using the configuration barcode 822. In another embodiment, the configuration barcode 822 can itself incorporate the configuration parameters needed by the venue app 812 to configure the hearing device 802 to receive the desired modified broadcast. In a further embodiment, the venue app 812 can receive an RF configuration code 824 transmitted by a beacon at the venue. The RF configuration code 824 can be used by the venue app 812 to acquire the appropriate configuration parameters from a server 825 or provide the necessary configuration parameters without having to access the server 825. Configuring the hearing device 802 for reception of a modified broadcast and subsequently resuming normal hearing device function can be implemented in a manner described above.

Figure 9:
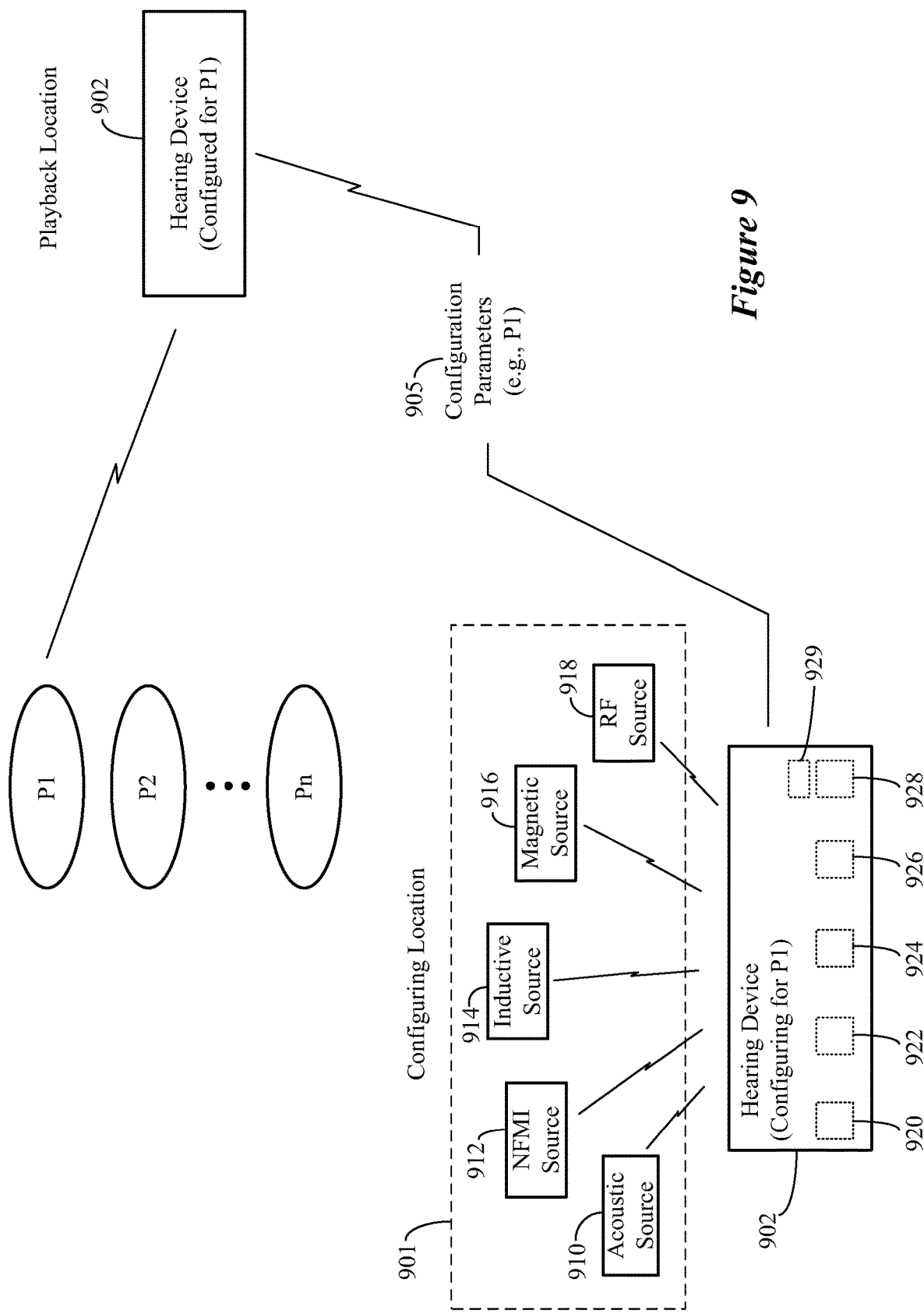
FIG. 9 illustrates a hearing device that can receive configuration parameters from a beacon situated at a multicast venue in accordance with various embodiments.

FIG. 9 illustrates a hearing device that can receive configuration parameters from a beacon situated at a multicast venue in accordance with various embodiments. In the embodiment shown in FIG. 9, a beacon 901 can be situated at a configuration location of the venue, which may be in a lobby or at an entrance of a room or region of the venue. For example, the beacon 901 can be situated in a kiosk, a ticket counter or a wall or other structure of the lobby or room/region (e.g., room entrance). The beacon 901 includes a configuration parameters source that transfers appropriate configuration information (e.g., for receiving audio program P1) to a hearing device 902 that passes nearby (e.g., within ~2 m). After completion of the configuration information transfer, the hearing device 902 configures itself to enable reception of a selected audio program (e.g., P1). The wearer of the hearing device 902 proceeds into the appropriate presentation room (playback location) where the selected audio program (e.g., P1) is received and played back in the wearer's ears.

For example, the venue may include a number of different presentation rooms, and a beacon 901 may be situated at each room entrance. In an implementation in which the beacon 901 is provided at a lobby kiosk, a selected audio program or presentation room is selected (e.g., after paying a fee) so that the configuration parameters transferred to the hearing device 902 in the lobby are specific to the desired audio program or presentation room (e.g., playback location). In an implementation in which the beacon 901 is provided at the entrance of a presentation room, selecting an audio program or presentation room is not needed since the hearing device 902 is automatically configured by the beacon 901 at the room entrance. In general, the beacon 901 emits audio program-specific configuration parameters 905 that can be detected by a hearing device 902 in close proximity (e.g., ~2 m) with the beacon 901. This close proximity requirement serves to preclude eavesdropping between the beacon 901 and any other hearing devices or other portable communication devices that may be nearby.

According to one embodiment, the beacon 901 may include an acoustic source 910 which can generate a predetermined acoustic pattern containing configuration parameter information. The microphone(s) 920 of the hearing device 902 receives the acoustic pattern, and electronics of the hearing device 902 decode the configuration parameter information encoded in the acoustic pattern. In another embodiment, the beacon 901 may include a near-field magnetic induction (NFMI) source 912 which can generate and magnetic signal containing configuration parameter information. The hearing device 902 can include in an NFMI sensor 922 which receives the magnetic signal, and electronics of the hearing device 902 extracts the configuration parameter information encoded in the magnetic signal. In a further embodiment, the beacon 901 may include an induction source 914 which can cooperate with an inductive recharge coil 924 of the hearing device 902 to generate a signal in the recharge coil 924 encoded with configuration parameter information. Electronics of the hearing device 902 can decode the configuration parameter information encoded in the induced signal.

In some embodiments, the beacon 901 may include a magnetic source 916 which can cooperate with a tunnel magnetoresistance (TMR) or a giant magnetoresistance (GMR) sensor 926 provided within the hearing device 902. Configuration parameter information can be transmitted from the magnetic source 916 to the TMR or GMR sensor 926 of the hearing device 902. Electronics of the hearing device 902 can extract the configuration information from the magnetic sensor output. The beacon 901 may include an RF source 918 which can transmit configuration parameter information to an RF receiver 928 (e.g., Bluetooth® Low Energy receiver) in the hearing device 902. Electronics of the hearing device 902 can extract the configuration parameter information from the RF signal received from the RF source 918.

In one embodiment, the RF source 918 of the beacon 901 can be configured to generate an envelope-modulated data stream, and the hearing device 902 can include a demodulator 929 that decodes the envelope modulation. For example, the RF source 918 can include an AM modulator that amplitude modulates a data stream produced by a BLE transceiver of the RF source 918. The hearing device 902 can include an AM demodulator 929 that extracts the configuration information from the received AM data stream. In this example, BLE protocol need not be used, and the AM data stream may not be a BLE compliant data stream. According to some embodiments, the RF source 918 can generate a frequency modulated (FM) data stream, and an FM demodulator 929 of the hearing device 902 can extract the configuration information from the received FM data stream.

Embodiments of the disclosure described hereinabove can be implemented for use in a wide variety of scenarios. Representative use scenarios include movie theaters, live theaters, concert halls, museums, churches, classrooms, conference and meeting rooms, arenas and stadiums, medical offices, amusement parks, airports, train stations, and other transportation hubs. Other representative use scenarios include ticketing windows, store checkout counters, taxicabs, buses, other motor coaches, airplanes, trains, other types of transportation, car radio audio, and home entertainment systems. In the context of home entertainment systems for example, embodiments can enable a hearing device user from not hearing neighbors or preventing neighbors from listening in.

Further representative use scenarios include companion microphone multicasting, such as audio tour guides, and public address systems configured to communicate a modified broadcast to hearing devices (e.g., hearing aids). For example, two or three channels of a public address system can be dedicated strictly for public address announcements, and hearing devices can be configured to automatically play these channels when an alert stream is being broadcasted.

For example, a multiplicity of broadcasts may be available within the same region, such as a theater or a convention hall booth. There may be multiple broadcasts for various different languages. In such a scenario, a hearing device would know which language identifier it should be looking for based on how the hearing device has been programmed (via an out-of-band configuration source) to meet the needs/preferences of the wearer. As another example, a hearing device may receive gate-specific configuration parameters from an out-of-band configuration source at or near a particular gate at an airport. The hearing device would look for communications specific to the particular gate in public address announcements broadcasted in the airport. As was discussed previously, intermediary devices can be used to implement embodiments of the disclosure, such as headsets, neck loop receivers, and BLE compatible tablets and phones, for example.

Another representative use scenario can involve a plurality of overlapping audio broadcast channels in one room/region or streaming situation, including streams intended solely for recipients who are hearing impaired. It is known that people who are hearing impaired may have difficulty understanding speech in the presence of noise and distracting events. This can be true for both acoustic and streamed input. Moreover, hearing-aid sound quality is subjective and can vary, even between people with similar hearing loss profiles. In some embodiments, certain 'hearing impaired only' broadcast channels can be created and/or prepared for each user, either on a general or individualized basis using the audiogram and/or other measures of the user's state and/or the source material. Processing applied to these audio streams can include, but is not limited to, compressive amplification, dynamic range expansion, noise reduction, pitch adjustment/frequency lowering, binaural spatial enhancement and/or speech enhancement algorithms. These processing methods may be applied using a DSP provided within the transmitter and/or receiver. The user may wish to control the channel selection or facets of the signal processing applied to a channel using a plurality of user interfaces. Embodiments can extend to hearing device wearers who do not have a measurable hearing impairment but still wish to benefit from enhancements of the source material. Such source material can include, but is not limited to, motion picture audio, airport gate announcements, church services or other places of public gathering that have public address system(s).

A modified-broadcast scheme in accordance with the present disclosure can also be leveraged to transmit other information to assist the hearing impaired user. For example, additional information can be used in the context of audio streaming or in the context of a sensor network. Additional capabilities include transmitting and receiving closed captioning data and streaming video or other cues to a remote device. Other capabilities include transmitting data regarding the location and/or tracking of the hearing device, which can allow for customized head-related transfer functions (HRTF) to be applied to the audio stream. Data regarding the location and/or tracking of the hearing device can also allow for location-dependent filter coefficients to be applied by the hearing device based upon known impulse room responses.

Figure 10:
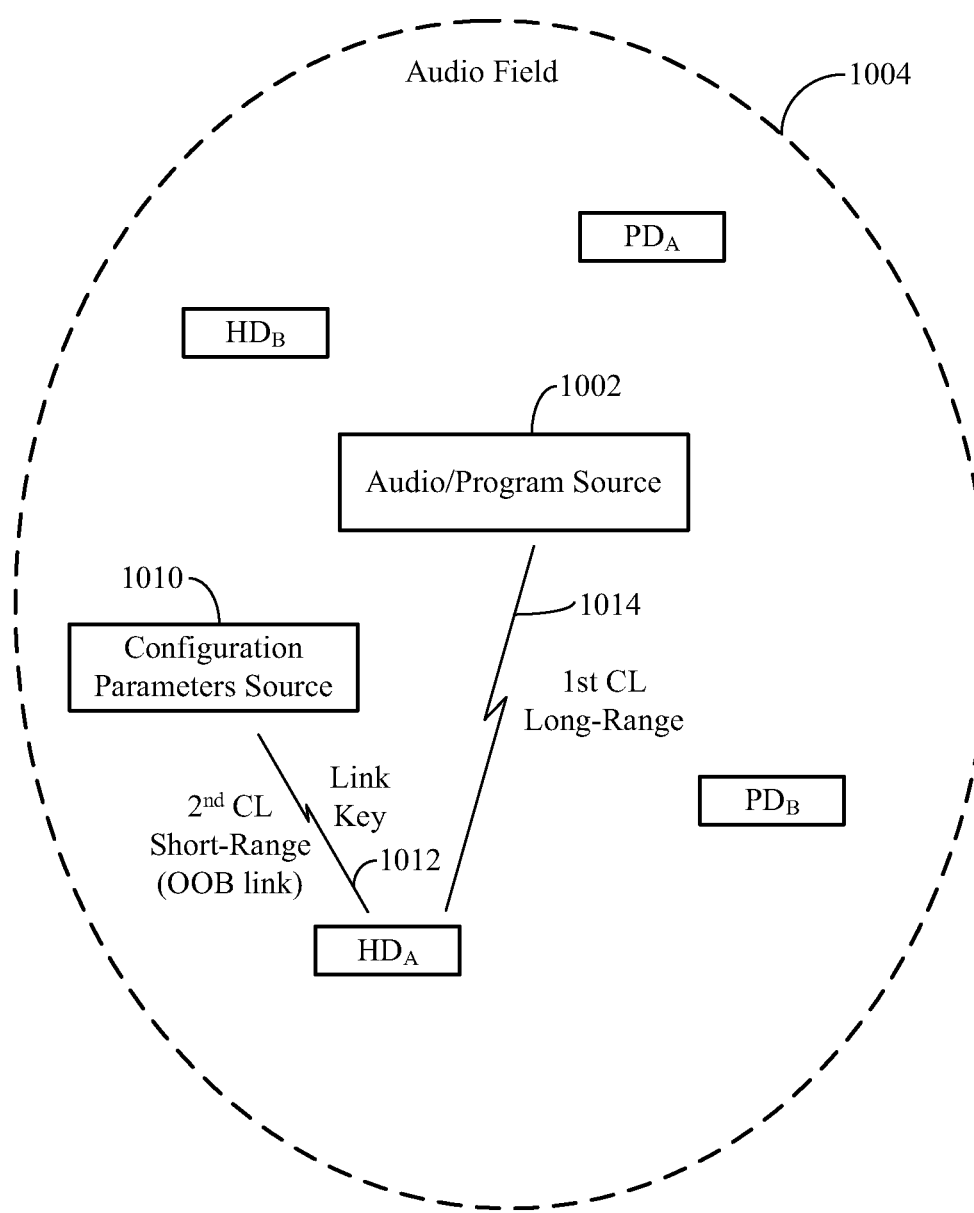
FIG. 10 illustrates a venue in which communication between a hearing device and an audio or program source is secured using a cryptographic key acquired by the hearing device via an out of band communication link in accordance with various embodiments.
Figure 11:
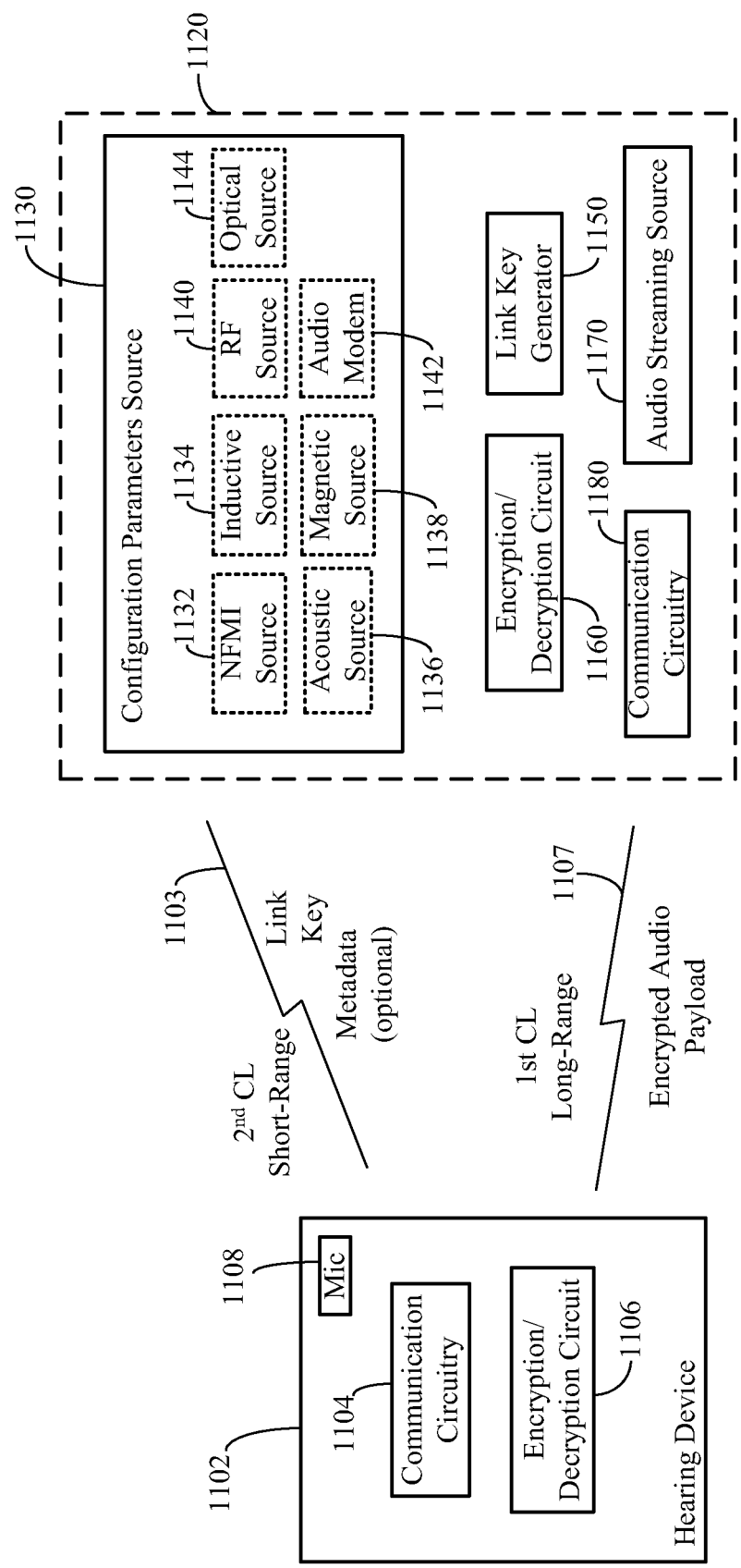
FIG. 11 illustrates a hearing device configured to communicate with an audio streaming system in accordance with various embodiments.
Figure 12:
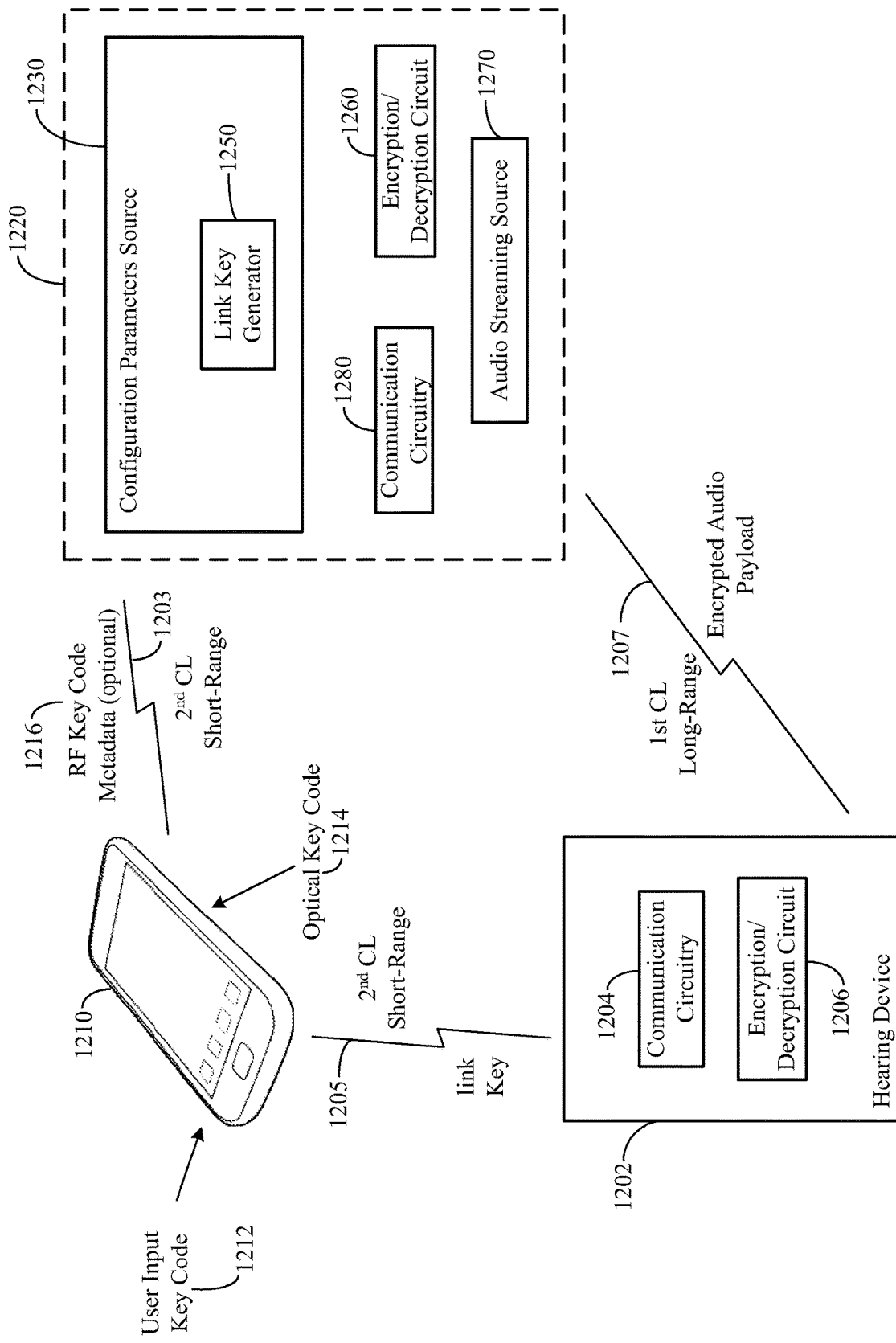
FIG. 12 illustrates an embodiment in which a smartphone serves as an intermediary device for transmitting a cryptographic key from an audio streaming system to a hearing device in accordance with various embodiments.

FIGS. 10-12 are directed to embodiments in which communication between a hearing device and an audio or program source is secured using a cryptographic key acquired by the hearing device via an out of band communication link. In various embodiments, a hearing device is configured to enable reception of audio streaming via a secured first communication link in response to receiving a cryptographic key (e.g., a link key or a session key) via a second communication link. In general, audio streaming is received by the hearing device via a long-range communication link (e.g., ≥10 m), and the cryptographic key is received by the hearing device via a short-range communication link (e.g., ≤2 m). In some embodiments, the long-range communication link can be a Bluetooth® link (e.g., a Bluetooth® 5 link), such as a BLE link.

Referring to FIG. 10, a hearing device, $HD_A$, is shown communicating with an audio/program source 1002 and a configuration parameters source 1010. In the use scenario shown in FIG. 10, the wearer of the hearing device, $HD_A$, may wish to receive an audio program or establish verbal communications with the audio/program source 1002. When broadcasting audio, the audio/program source 1002 generates an audio field 1004 which is receivable by the hearing device, $HD_A$, and other communication devices (e.g., other hearing devices and/or smartphones).

In order to prevent unsecured reception of the audio program or verbal communications within the audio field 1004, the hearing device, $HD_A$, is configured to receive a cryptographic key from the configuration parameters source 1010, which is typically situated in the vicinity of the audio/program source 1002. In some implementations, the configuration parameters source 1010 can be part of or immediately proximate the audio/program source 1002 (e.g., at a bank teller station or drive-up window). In other implementations, the configuration parameters source 1010 can be situated in or at a structure (e.g., a kiosk or a ticket counter) that is physically separate from the audio/program source 1002 (e.g., a transmitter in a theater).

For illustrative purposes, the cryptographic key will be referred to as a link key, which may be a session key. The configuration parameters source 1010 can be integral to the audio/program source 1002 or linked via a hardwired or secured wireless connection. The audio/program source 1002 can generate the link key and cooperate with the configuration parameters source 1010 to transmit the link key to the hearing device, $HD_A$. The hearing device, $HD_A$, is configured to receive the link key from the configuration parameters source 1010 via a short-range (e.g., ~2 m) out of band link 1012, examples of which are described herein below. After the hearing device, $HD_A$, receives the link key, a pairing process with the audio/program source 1002 can ensue.

After completion of the pairing process, a secured communication link (e.g., communication link 1014) is established between the hearing device, $HD_A$, and the audio/program source 1002. The wearer of the hearing device, $HD_A$, can move freely within the audio field 1004 and remain connected with the audio/program source 1002 via the secured communication link 1014. Because other personal communication devices within the audio field 1004 in the illustrative example of FIG. 10 do not possess the link key, these devices are unable to receive the audio program and/or verbal communications from the audio/program source 1002.

FIG. 11 illustrates a hearing device 1102 configured to communicate with an audio streaming system 1120 in accordance with various embodiments. The audio streaming system 1120 shown in FIG. 11 includes a configuration parameters source 1130, a link key generator 1150, an encryption/decryption circuit 1160, an audio streaming source 1170, and communication circuitry 1180. Either the audio streaming system 1120 or the hearing device 1102 can initiate security procedures before a communication link is established between the two entities. According to some embodiments, the link key generator 1150 is configured to generate a secret link key the first time the audio streaming source 1170 and the hearing device 1102 communicate. The configuration parameters source 1130 is configured to transmit the link key to the hearing device 1102 via an out of band, short-range communication link 1103.

Communication circuitry 1104 of the hearing device 1102 is configured to establish the out of band communication link 1103, referred to as a second communication link, with the configuration parameters source 1130 of the audio streaming system 1120. As will be described herein below, the design of the communication circuitry 1104 can vary in terms of structure and function depending on the type of communication device incorporated in the configuration parameters source 1130. After transferring the link key from the configuration parameters source 1132 to the hearing device 1102 via the second communication link 1103, and after successful pairing, the first communication link 1107 is established between the hearing device 1102 and the audio streaming system 1120.

According to various embodiments, the encryption/decryption circuit 1160 of the audio streaming system 1120 encrypts audio payload using the link key for transmission to the hearing device 1102 via the communication circuitry 1180. Encrypted audio payload is transmitted from the communication circuitry 1180 to the communication circuitry 1104 of the hearing device 1102 via the first communication channel 1107. After receiving the encrypted audio payload, an encryption/decryption circuit 1106 of the hearing device 1102 decrypts the received audio payload. The decrypted audio payload can then be played back to the wearer of the hearing device 1102. It is noted that, although FIG. 11 shows a single hearing device 1102 communicating with the audio streaming system 1120, a typical hearing device wearer will use a pair of hearing devices 1102, one for each ear. The link key is preferably transmitted to both hearing devices 1102 in a manner previously described. In some embodiments, a first of a pair of hearing devices can be configured to receive the link key. A second of the pair of hearing devices can be configured to receive the link key from the first hearing device, via a device-to-device (e.g., ear-to-ear) secure communication link.

In some embodiments, in addition to the link key, metadata can be transferred from the audio streaming system 1120 the hearing device 1102 via the out of band link 1103. The metadata can include information regarding the nature or use of the audio content transmitted from the audio streaming system 1120 to the hearing device 1102. For example, the wearer of the hearing device 1102 may purchase a ticket for a given show at a cinema or other venue. The metadata can include the duration of an event that the hearing device user is authorized to listen to the content, thereby preventing unauthorized listening to content beyond the purchased ticket duration.

The link key can be disabled at the end of the event, such as by way of a long-distance wireless link. Also, the link key can be change periodically during the audio transmission in which case the user would need to refresh the link key. Once the event is completed, the link key preferably becomes inactive. Various mechanisms to expire the link key can be implemented to prevent eavesdropping. It is noted that an ear-to-ear link could be used to ensure that hearing devices in both ears have received the link key initially by communication between the two devices and to synchronize the disabling of the key at the end of the authorized time.

As was discussed previously, the out of band link 1103 between the audio streaming system 1120 and the hearing device 1102 is preferably a short-range link, such as on the order of about two meters or less. The close proximity required to support the out of band link 1103 serves to preclude eavesdropping by other hearing devices or other portable communication devices in proximity with the audio streaming system 1120 during the time in which a link key is acquired by the hearing device 1102. According to one embodiment, the configuration parameters source 1130 can include an NFMI source 1132 which can generate a magnetic signal containing the link key. The communication circuitry 1104 of the hearing device 1102 can include an NFMI sensor which receives the magnetic signal via the short-range link 1103. Electronics of the hearing device 1102 can extract the link key encoded in the received magnetic signal.

In some embodiments, the configuration parameters source 1130 can include an inductive source 1134 which cooperates with an inductive coil (e.g., recharge coil) of the hearing device 1102 to generate a signal in the inductive coil encoded with the link key. Electronics of the hearing device 1102 can decode the link key encoded in the induced signal transmitted via the short-range link 1103. In other embodiments, the configuration parameters source 1130 can include an acoustic source 1136, such as an ultrasonic source. The link key can be transmitted from the acoustic source 1136 to the microphone 1108 or tele-coil (not shown) of the hearing device 1102 via the short-range link 1103. The link key can be extracted from the acoustic signal produced by the acoustic source 1136.

In some embodiments, the configuration parameters source 1130 can include a magnetic source 1138 which can cooperate with a magnetic sensor (e.g., TMR sensor GMR) provided within the communication circuitry 1104 of the hearing device 1102. The link key can be transmitted from the magnetic source 1138 to the magnetic sensor of the hearing device 1102 via the short-range link 1103, and electronics of the hearing device 1102 can extract the link key from the magnetic sensor output. In further embodiments, the configuration parameters source 1130 can include an RF source 1140 which can transmit the link key to an RF receiver (e.g., Bluetooth® receiver) in the hearing device 1102 using a short-range AM or FM technique previously described via the short-range link 1103. Electronics of the hearing device 1102 can extract the link key from the RF signal received from the RF source 1140.

In another embodiment, an audio modem 1142 of the configuration parameters source 1130 can be used to communicate a link key to the hearing device 1102 via the short range link 1103. According to one approach, a tele-coil of the configuration parameters source 1130 can be used to send the link key as a DTMF or FSK modulated signal generated by the audio modem 1142. A tele-coil of the communications circuitry 1104 at the hearing device 1102 can receive the modulated signal. In other embodiments, the modulated signal produced by the audio modem 1142 can be sent audibly to the hearing device 1102 using the embedded microphone(s) 1108. In further embodiments, a modulated signal produced by the audio modem 1142 can be sent to both the tele-coil and embedded microphone(s) 1108 of the hearing device 1102. In such embodiments, validating proper receipt of the link key can require receipt of the identical link key via both the tele-coil and the embedded microphone(s) 1108. In some embodiments, an optical source 1144 of the configuration parameters source 1130 can be used to communicate a link key to the hearing device 1102 via the short range link 1103. For example, the optical source 1144 can transmit an infrared signal containing the link key to an optical receiver of the hearing device 1102.

Embodiments of the disclosure that involve use of a link key are particularly useful in scenarios where secured communications between an audio streaming source and one or more hearing devices is required due to the confidential or sensitive nature of the audio content being transmitted or requirements imposed by digital rights management rules. For example, broadcasting of audio content in a cinema or live theater scenario may require adherence to digital rights management rules, in which audio must be sent securely to only those persons who have paid for the experience. The above-described methods of transferring temporary link keys (e.g., session keys) between an audio streaming source and a multiplicity of hearing devices can facilitate compliance with digital rights management rules and security requirements.

FIG. 12 illustrates an embodiment in which a smartphone 1210 serves as an intermediary device for transmitting a link key from an audio streaming system 1220 to a hearing device 1202. The audio streaming system 1220 includes many of the components shown in the embodiment of FIG. 11, including a configuration parameters source 1230, a link key generator 1250, an encryption/decryption circuit 1260, an audio streaming source 1270, and communication circuitry 1280. The hearing device 1202 includes many of the components shown in the embodiment of FIG. 11, including communication circuitry 1204 and an encryption/decryption circuit 1206. The smartphone 1210 can be paired with the hearing device 1202, thus establishing a secured communication link 1205 (e.g., a BLE link) between the two devices. Because the smartphone 1210 is typically held in the wearer's hand during the connection procedure, the communication link 1205 between the smartphone 1210 and the hearing device 1202 is considered a short-range communication link (≤~2 m).

According to some embodiments, an optical key code 1214 can be scanned or photographed using the camera of the smartphone 1210. The optical key code 1214 can be a bar code or a QR code, for example. The smartphone 1210 uses the scanned or photographed optical key code 1214 to generate a link key, which is then transmitted to the communication circuitry 1204 (e.g., BLE transceiver) of the hearing device 1202. It is understood that the configuration parameters source 1230 of the audio streaming system 1220 has the same link key as that read by the smartphone 1210. Having received the link key, a secured long-range communication link 1207 can be established between the hearing device 1202 and the audio streaming system 1220. As was discussed previously, encrypted audio payload can be streamed from the audio streaming system 1220 to the hearing device 1202 for decryption and play back to the wearer, such as for a duration of time indicated by metadata that can accompany the optical key code 1214 read by the smartphone 1210.

According to other embodiments, the wearer of the hearing device 1202 can receive a key code 1212 from a verbal or visual source, such as from a ticket agent or a kiosk display. The key code 1212 can be keyed into the smartphone 1210 by the wearer. The smartphone 1210 uses the manually input key code 1212 to generate a link key corresponding to the key code 1212, which is then transmitted to the communication circuitry 1204 of the hearing device 1202. Audio streaming from the audio streaming system 1220 to the hearing device 1202 can ensue after pairing with the hearing device 1202 in a manner described previously.

In another embodiment, the configuration parameters source 1230 of the audio streaming system 1220 can transmit a short-range RF signal that includes a key code 1216 via a second communication link 1203 (e.g., BLE link) to the smartphone 1210. The power of the short-range RF signal that includes the key code 1216 can be limited such that it has a range of reception limited to about 2 m. The smartphone 1210 can then transfer the link key to the communication circuitry 1204 the hearing device 1202. Audio streaming from the audio streaming system 1220 to the hearing device 1202 can ensue after pairing with the hearing device 1202 in a manner described hereinabove.

According to some embodiments, various hearing device operations or states can trigger one or more events involving the hearing device and/or a smartphone that interacts with the hearing device. For example, receiving configuration parameters, initiating reception of a selected audio program, receiving a link key, and/or terminating a link key can trigger one or more events involving the hearing device and/or the smartphone. For example, the smartphone can be automatically muted at the beginning of an audio program then unmuted at the conclusion of the audio program (e.g., a smartphone should not be allowed to ring in a theater environment). The mode of the hearing device can be adjusted based on characteristics of the venue or the audio program. For example, the hearing device can be placed in a more linear mode at a music concert or an opera to better capture source dynamics. In a rock concert scenario, the hearing device can be placed in a more compressed state, following guidance for safe noise dosage for example.

By way of further example, a museum exhibit may be set-up such that a hearing device wearer moves from one exhibit area to another. Each exhibit area can have its own audio stream to provide the hearing device wearer with information on that exhibit. Devices can be placed at the entrance to each exhibit to trigger a change from the previous exhibit audio stream to an upcoming exhibit audio stream. The device used to trigger the change in the stream can be of a variety of communications as described earlier.

In another representative scenario, audio can be streamed to a hearing device wearer, but the hearing device can be directed to also keep its microphones on so the wearer has access to acoustic information within the environment (e.g., when driving a car and listening to the radio, when receiving a stream from a remote microphone of one person but where other communication partners who aren't "mic-ed up" are also present, etc.). This is in contrast to a movie theater where environmental acoustics would be undesirable and the microphones on the devices could be muted. The user's experience can also be influenced based upon how the hearing device(s) are programmed to meet the needs/preferences of the end user.

This document discloses numerous embodiments, including but not limited to the following:

Item 1 is a hearing device adapted for use by a wearer, the hearing device comprising:

an audio streaming circuit configured to receive electromagnetic audio streaming via a first communication link;

a configuration circuit configured to receive configuration parameters via a second communication link different from the first communication link for configuring the hearing device to receive the electromagnetic audio streaming; and control circuitry that configures the hearing device to enable reception of the electromagnetic audio streaming in accordance with the received configuration parameters.

Item 2 is the hearing device of item 1, wherein the second communication link is an out of band link.

Item 3 is the hearing device of item 1, wherein:

the first communication link comprises a long-range communication link configured to communicatively couple an electromagnetic audio streaming source and the hearing device; and the second communication link comprises a short-range communication link configured to communicatively couple a source of the configuration parameters and the hearing device.

Item 4 is the hearing device of item 1, wherein:

the audio streaming circuit comprises a Bluetooth® Low Energy transceiver for establishing the first communication link; and the hearing device comprises a second communication device configured to establish an out of band link as the second communication link.

Item 5 is the hearing device of item 1, wherein:

the hearing device comprises a magnetic sensor; and the second communication link comprises a link between a source of the configuration parameters and the magnetic sensor.

Item 6 is the hearing device of item 1, wherein:

the configuration parameters are encoded in an acoustic or ultrasonic signal; and the second communication link comprises a link between a source of the acoustic or ultrasonic signal and a microphone of the hearing device.

Item 7 is the hearing device of item 1, wherein:

the hearing device comprises a demodulator;

the configuration parameters are encoded in a modulated signal received by the hearing device via the second communication link; and the demodulator is configured to demodulate the modulated signal to extract the configuration parameters.

Item 8 is the hearing device of item 1, wherein:

the second communication link comprises a link between the hearing device and a portable communication device; and the configuration parameters received by the hearing device from the portable communication device are determined based on configuration information received by the portable communication device.

Item 9 is the hearing device of item 1, wherein the configuration circuit is configured to receive configuration parameters via the second communication link established between the hearing device and a beacon when the hearing device is within a predetermined distance from the beacon.

Item 10 is the hearing device of item 1, wherein:

the configuration parameters comprise a predetermined stream identifier;

the audio streaming circuit is configured to receive stream identifiers for a plurality of electromagnetic audio streams;

the configuration circuit is configured to select an electromagnetic audio stream from the plurality of electromagnetic audio streams that includes the predetermined stream identifier; and the control circuitry configures the hearing device to receive the selected electromagnetic audio stream and play the selected audio stream to the wearer's ear.

Item 11 is the hearing device of item 10, wherein the hearing device is communicatively coupled to an audio streaming source that outputs the selected audio stream without pairing with the audio streaming source.

Item 12 is the hearing device of item 10, wherein the control circuitry is configured to modify operation of the hearing device in response to a triggering event associated with communicative coupling between the hearing device and an audio streaming source that outputs the selected audio stream.

Item 13 is the hearing device of item 1, wherein:

the hearing device comprises a decryption circuit; and the configuration parameters comprise a key usable by the decryption circuit to enable decryption of an encrypted audio stream received by the audio streaming circuit.

Item 14 is the hearing device of item 13, wherein the control circuitry is configured to disable the key in response to a predetermined event.

Item 15 is a method of communications for a hearing device configured for use by a wearer, comprising:

receiving electromagnetic audio streaming by the hearing device via a first communication link;

receiving configuration parameters by the hearing device via a second communication link different from the first communication link; and configuring the hearing device to enable reception of the electromagnetic audio streaming in accordance with the received configuration parameters.

Item 16 is the method of item 15, wherein:

the first communication link comprises a long-range communication link configured to communicatively couple an electromagnetic audio streaming source and the hearing device; and the second communication link comprises a short-range out of band communication link configured to communicatively couple a source of the configuration parameters and the hearing device.

Item 17 is the method of item 15, wherein:

the configuration parameters comprise a predetermined stream identifier;

receiving electromagnetic audio streaming comprises receiving stream identifiers for a plurality of electromagnetic audio streams;

the method further comprises selecting an electromagnetic audio stream from the plurality of electromagnetic audio streams that includes the predetermined stream identifier; and configuring the hearing device comprises configuring the hearing device to receive the selected electromagnetic audio stream and play the selected audio stream to the wearer's ear.

Item 18 is the method of item 15, wherein the electromagnetic audio streaming is received by the hearing device without being paired to a source of the electromagnetic audio streaming.

Item 19 is the method of item 15, wherein:

the configuration parameters comprise a decryption key; and the method comprises decrypting the received audio streaming using the key.

Item 20 is the method of item 19, comprising disabling the key in response to a predetermined event.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A hearing device adapted for use by a wearer, the hearing device comprising:
   a decryption circuit;
   an audio streaming circuit configured to establish wireless connectivity with an electromagnetic audio streaming source via a first communication link, the audio streaming circuit configured to receive an encrypted audio stream from the electromagnetic audio streaming source via the first communication link;
   a configuration circuit configured to receive configuration parameters via a second communication link different from the first communication link for configuring the hearing device to receive electromagnetic audio streaming from the electromagnetic audio streaming source via the first communication link, the configuration parameters comprising a key usable by the decryption circuit to enable decryption of the encrypted audio stream; and
   control circuitry that configures the hearing device to enable reception of the electromagnetic audio streaming and to decrypt the encrypted audio stream using the key.

2. The hearing device of claim 1, wherein the second communication link is an out of band link.

3. The hearing device of claim 1, wherein:
   the first communication link comprises a long-range communication link configured to communicatively couple the electromagnetic audio streaming source and the hearing device; and
   the second communication link comprises a short-range communication link configured to communicatively couple a source of the configuration parameters and the hearing device.

4. The hearing device of claim 1, wherein:
   the audio streaming circuit comprises a Bluetooth® Low Energy transceiver for establishing the first communication link; and
   the hearing device comprises a second communication device configured to establish an out of band link as the second communication link.

5. The hearing device of claim 1, wherein:
   the hearing device comprises a magnetic or optical sensor; and
   the second communication link comprises a link between a source of the configuration parameters and the magnetic or optical sensor.

6. The hearing device of claim 1, wherein:
   the configuration parameters are encoded in an acoustic or ultrasonic signal; and
   the second communication link comprises a link between a source of the acoustic or ultrasonic signal and a microphone of the hearing device.

7. The hearing device of claim 1, wherein:
   the hearing device comprises a demodulator;
   the configuration parameters are encoded in a modulated signal received by the hearing device via the second communication link; and
   the demodulator is configured to demodulate the modulated signal to extract the configuration parameters.

8. The hearing device of claim 1, wherein:
   the second communication link comprises a link between the hearing device and a portable communication device; and
   the configuration parameters received by the hearing device from the portable communication device are determined based on configuration information received by the portable communication device.

9. The hearing device of claim 1, wherein the configuration circuit is configured to receive configuration parameters via the second communication link established between the hearing device and a beacon when the hearing device is within a predetermined distance from the beacon.

10. The hearing device of claim 1, wherein the control circuitry is configured to disable the key in response to a predetermined event.

11. The hearing device of claim 1, wherein:
    the configuration parameters comprise a predetermined stream identifier;
    the audio streaming circuit is configured to receive stream identifiers for a plurality of encrypted electromagnetic audio streams;
    the configuration circuit is configured to select an encrypted electromagnetic audio stream from the plurality of encrypted electromagnetic audio streams that includes the predetermined stream identifier; and
    the control circuitry configures the hearing device to receive the selected encrypted electromagnetic audio stream, decrypt the selected encrypted audio stream using the key, and play the selected decrypted audio stream to the wearer's ear.

12. A hearing device adapted for use by a wearer, the hearing device comprising:
    a decryption circuit;
    an audio streaming circuit configured to establish wireless connectivity with an electromagnetic audio streaming source via a first communication link, the audio streaming circuit configured to receive an encrypted audio stream from the electromagnetic audio streaming source via the first communication link;
    a configuration circuit configured to receive a key via a second out of band communication link different from the first communication link, the key usable by the decryption circuit to enable decryption of the encrypted audio stream; and
    control circuitry that configures the hearing device to decrypt the encrypted audio stream using the key and to play back the decrypted audio stream to the wearer's ear.

13. The hearing device of claim 1, wherein:
    the first communication link comprises a long-range communication link configured to communicatively couple the electromagnetic audio streaming source and the hearing device; and
    the second out of band communication link comprises a short-range communication link configured to communicatively couple a source of the key and the hearing device.

14. The hearing device of claim 1, wherein:
    the hearing device comprises a magnetic or optical sensor; and
    the second out of band communication link comprises a link between a source of the key and the magnetic or optical sensor.

15. The hearing device of claim 1, wherein:
    the key is encoded in an acoustic or ultrasonic signal; and
    the second out of band communication link comprises a link between a source of the acoustic or ultrasonic signal and a microphone of the hearing device.

16. The hearing device of claim 1, wherein:

the hearing device comprises a demodulator;

the key is encoded in a modulated signal received by the hearing device via the second out of band communication link; and the demodulator is configured to demodulate the modulated signal to extract the key.

17. The hearing device of claim 1, wherein the configuration circuit is configured to receive the key via the second out of band communication link established between the hearing device and a beacon when the hearing device is within a predetermined distance from the beacon.

18. The hearing device of claim 1, wherein the control circuitry is configured to disable the key in response to a predetermined event.

19. A method of communications for a hearing device configured for use by a wearer, comprising:

establishing wireless connectivity between an electromagnetic audio streaming source and the hearing device via a first communication link;

receiving, by the hearing device, an encrypted audio stream from the electromagnetic audio streaming source via the first communication link;

receiving, by the hearing device, a key via a second out of band communication link different from the first communication link, the key usable by the hearing device to enable decryption of the encrypted audio stream;

decrypting the encrypted audio stream using the key; and playing back the decrypted audio stream to the wearer's ear.

20. The method of claim 19, wherein:

the first communication link comprises a long-range communication link configured to communicatively couple the electromagnetic audio streaming source and the hearing device; and the second out of band communication link comprises a short-range communication link configured to communicatively couple a source of the key and the hearing device.

21. The method of claim 19, comprising disabling the key in response to a predetermined event.

22. The method of claim 19, comprising:

receiving, by the hearing device, stream identifiers for a plurality of audio streams, the plurality of audio streams comprising at least one encrypted audio stream;

receiving, by the hearing device, a predetermined stream identifier from the electromagnetic audio streaming source via the first communication link;

selecting, by the hearing device, an audio stream from the plurality of audio streams that includes the predetermined stream identifier;

receiving, by the hearing device, the selected audio stream;

decrypting, in response to the selected audio stream constituting the at least one encrypted audio stream, the selected encrypted audio stream using the key; and playing back the selected decrypted audio stream to the wearer's ear.

\* \* \* \* \*